United States Patent
Santosa et al.

(10) Patent No.: US 12,541,281 B2
(45) Date of Patent: Feb. 3, 2026

(54) OPPORTUNISTIC ADAPTIVE TANGIBLE USER INTERFACES FOR USE IN EXTENDED REALITY ENVIRONMENTS

(71) Applicant: Meta Platforms Technologies, LLC, Menlo Park, CA (US)

(72) Inventors: Stephanie Santosa, Toronto (CA); Frances Cin-Yee Lai, York (CA); Michael Glueck, Toronto (CA); Daniel Clarke, Bradford (CA); Tovi Grossman, Etobicoke (CA); Weilun Gong, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 46 days.

(21) Appl. No.: 18/460,061

(22) Filed: Sep. 1, 2023

(65) Prior Publication Data

US 2024/0077986 A1  Mar. 7, 2024

Related U.S. Application Data

(60) Provisional application No. 63/374,861, filed on Sep. 7, 2022.

(51) Int. Cl.
*G06F 3/04815* (2022.01)
*G06F 3/01* (2006.01)
(Continued)

(52) U.S. Cl.
CPC ........ *G06F 3/04815* (2013.01); *G06F 3/011* (2013.01); *G06F 3/017* (2013.01);
(Continued)

(58) Field of Classification Search
CPC ...... G06F 3/04815; G06F 3/011; G06F 3/017; G06F 3/04842; G06F 3/0488; G06T 7/10; G06T 19/006; G06T 2200/24; G06V 20/20

See application file for complete search history.

(56) References Cited

U.S. PATENT DOCUMENTS 7,215,322 B2 * 5/2007 Genc .................. G06F 3/011
   345/157
9,846,970 B2 * 12/2017 Anderson ............ G06T 19/006
(Continued)

*Primary Examiner* — Ke Xiao
*Assistant Examiner* — Jennifer L Zubajlo
(74) *Attorney, Agent, or Firm* — Morgan, Lewis & Bockius LLP

(57) ABSTRACT

An Adaptive Tangible User Interface (ATUI) for use in an extended reality environment in which tangible interfaces are composed in real time based on identified affordances of existing objects in the physical environment and the input tasks of a user. An extended reality system can be provided with instructions executable by one or more processors to perform processing including: generating a representation of the real-world environment within a field of view of the user; identifying physical objects within the real-world environment; generating a set of possible performable gestures afforded by available object affordance factors; determining potential input tasks; composing performable gestures for the potential input tasks; and selecting a physical object for use as an adaptive tangible user interface. Techniques for designing a virtual user interface, overlaying the virtual user interface on a selected ATUI physical object, and maintaining alignment of the virtual user interface, are also provided.

23 Claims, 22 Drawing Sheets

(51) Int. Cl.

| | | |
|---|---|---|
| *G06F 3/04842* | (2022.01) | |
| *G06F 3/0488* | (2022.01) | |
| *G06T 7/10* | (2017.01) | |
| *G06T 19/00* | (2011.01) | |
| *G06V 20/20* | (2022.01) | |

(52) U.S. Cl.
CPC ........ *G06F 3/04842* (2013.01); *G06F 3/0488* (2013.01); *G06T 7/10* (2017.01); *G06T 19/006* (2013.01); *G06V 20/20* (2022.01); *G06T 2200/24* (2013.01)

(56) References Cited

U.S. PATENT DOCUMENTS

| | | | | |
|---|---|---|---|---|
| 10,019,962 | B2 * | 7/2018 | Liu | G06F 3/011 |
| 10,311,543 | B2 * | 6/2019 | Energin | G06F 3/017 |
| 10,909,405 | B1 * | 2/2021 | Golard | G06V 10/764 |
| 11,340,756 | B2 * | 5/2022 | Faulkner | G06F 3/013 |
| 2012/0169482 | A1 * | 7/2012 | Chen | G08C 17/02 |
| | | | | 340/12.52 |
| 2013/0194402 | A1 * | 8/2013 | Amedi | G09B 21/006 |
| | | | | 348/62 |
| 2016/0313902 | A1 * | 10/2016 | Hill | G06F 3/0482 |
| 2018/0018508 | A1 * | 1/2018 | Tusch | G06V 20/52 |
| 2018/0196523 | A1 * | 7/2018 | Arana | A63F 13/212 |
| 2018/0260843 | A1 * | 9/2018 | Hiranandani | G06Q 30/0255 |
| 2019/0121522 | A1 * | 4/2019 | Davis | G06V 40/28 |
| 2019/0339777 | A1 * | 11/2019 | Araújo | G06F 3/011 |
| 2021/0026524 | A1 * | 1/2021 | Hendrix | G05D 1/10 |
| 2021/0035333 | A1 * | 2/2021 | Wright | G06V 20/20 |
| 2021/0405959 | A1 * | 12/2021 | Lovitt | G06F 3/165 |
| 2022/0253126 | A1 * | 8/2022 | Holland | G06T 19/006 |
| 2023/0342677 | A1 * | 10/2023 | Desai | G06F 3/012 |
| 2024/0077986 | A1 * | 3/2024 | Santosa | G06V 20/20 |
| 2025/0150494 | A1 * | 5/2025 | Piira | G06N 20/00 |

* cited by examiner

| Taxonomy of object-based gestures for spatial interaction ||||
|---|---|---|---|
| Dimensions of taxonomy | Sub-categories | Description | Examples |
| *Dimensionality of Interaction command* | 0D | Express an on/off input | Tap on a table to press button |
| | 0.5D | Express a previous/next input | Use the index finger to swipe on a surface to control a carousel |
| | 1D | Express a continuous volume change input | Slide on a chocolate bar to control a slider |
| | 2D | Control the position of a virtual representation on a 2-dimensional space | Moving fingers on the surface of a desk like using a trackpad to control a webpage |
| | 3D | Manipulate a virtual object in a 3-dimensional space | Push a mug forward to move a virtual cube forward in a CAD software |
| | Multi-D | Use the combination of two or more input command simultaneously | Rotate a water bottle while squeezing it to control the direction and pedal of an airplane in a video game |
| *Expression Strategy* | Hand-centric | Express the intention of input with hand movements | Use the index finger to swipe on a surface to control a carousel |
| | Object-centric | Express the intention of input with object manipulation | Squeeze a water bottle to express "confirm" |
| | Object and hand centric | Express the intention of input by hand movement and manipulate objects at the same time | Use a pen as a stylus to point at a slider, then use the finger to slide on the surface of the pen to control the slider |
| *Mental Model* | Physical world Metaphorical | The gestures come from previous experience interacting with the physical world | Hold a chocolate bar like holding a steering wheel, and rotate it to control the direction of flight in a video game |
| | Digital world Metaphorical | The gestures come from previous experience interacting with digital devices | Moving fingers on the surface of a desk like using a trackpad to control a webpage |
| | Abstract | Subjectively defined gesture | To control a carousel, single tap to go next, double tap to go previous |
| *Signal* | Discrete | Gestures that control the targets with clear spaces between values | Tap on the surface of a mug to press a virtual button |
| | Continuous | Gestures that control the targets with no spaces between values | Slide on the surface of a desk to control a slider continuously |

FIG. 5

| List of object affordance factors | | | |
|---|---|---|---|
| Categories of object affordance factors | | | Affordance factors |
| Micro factors | Surface | size | [Surface]-Large |
| | | | [Surface]-Medium |
| | | | [Surface]-small |
| | | curvature | [Surface]-flat |
| | | | [Surface]-curved |
| | Edge | Length | [Edge]-long |
| | | | [Edge]-short |
| | | Curvature | [Edge]-flat |
| | | | [Edge]-curved |
| | Movable structure | on/off switch (like pen) | [Movable]-discrete |
| | | continuous | [Movable]-continuous |
| | Feedback | tactile feedback | [Feedback]-tactile |
| | | sound feedback | [Feedback]-sound |
| Macro factors | Semantics | 3D shape | [Semantics-3D shape]-Remote-like |
| | | | [Semantics-3D shape]-Controller-like |
| | | | [Semantics-3D shape]-Mouse-like |
| | | | [Semantics-3D shape]-Button-like |
| | | | [Semantics-3D shape]-Joystick-like |
| | | | [Semantics-3D shape]-tip-pointer |
| | | | [Semantics-3D shape]-Dial-like |
| | | | [Semantics-3D shape]-Wheel-like |
| | | Surface finish | [Semantics-surface]-pattern |
| | | | [Semantics-surface]-separate area |
| | Elasticity | Elastic | [Elastic] |
| | | Rigid | |
| | shape | sphere; cylinder; pyramid; cube; triangular; circular | [Shape]-sphere |
| | | | [Shape]-cylinder |
| | | | [Shape]-pyramid |
| | | | [Shape]-cube |
| | | | [Shape]-triangular |
| | | | [Shape]-circular |
| | Ergonomic | Grabability | [Ergonomic]-grabbable |
| | | Reachability | [Ergonomic]-reachable |
| | | Orientation | |

FIG. 6

| Affordance-based object taxonomy ||||||
| Gesture to afford | Preferred Object | Example | Basic Object | Example |
| --- | --- | --- | --- | --- |
| Finger Tap | Objects with a [defined small surface area] | Top surface of a bottle's cap | Any object with a [surface] | A bike handle |
| Discrete Movable Structure Input | Objects with a [discrete movable structure] | The button on the back of a pen | n/a | n/a |
| Press | Objects with [deformable elastic surface] or a [button-like shape] object part | A water bottle's side surface or the top surface of its cap | Any object with a [surface] | A bike handle |
| Squeeze | Objects with deformable elastic surface | A water bottle's side surface | n/a | n/a |
| Finger Swipe | Object with a [large and flat surface] | A working desk | Any object with a [surface] | A bike handle |
| Object Swipe | [Grabbable] objects with a [pointer-like tip] | A pen | Grabbable objects | An eraser |
| Finger Slide | Object with a [large and flat surface] and a [long edge] | A working desk | Any object with a [flat surface] | A cuboid juice bottle |
| Object Slide | [Grabbable] objects with a [pointer-like tip] | A pen | [Grabbable] objects | An eraser |
| Pinch and Splay | Object with a [large and flat surface] | A working desk | Any object with a [flat surface] | A cuboid juice bottle |
| Finger Move on Surface | Object with a [large and flat surface] | A working desk | Any object with a [flat surface] | A cuboid juice bottle |
| Object Rotate | [Grabbable] objects | An eraser | n/a | n/a |
| Object Move | [Grabbable] objects | An eraser | n/a | n/a |
| Pointing | [Grabbable] objects with a [pointer-like tip] | A pen | [Grabbable] objects | An eraser |

FIG. 7

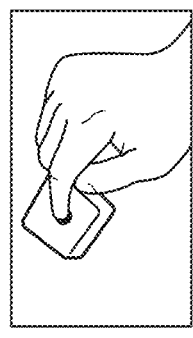
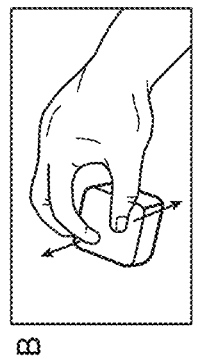
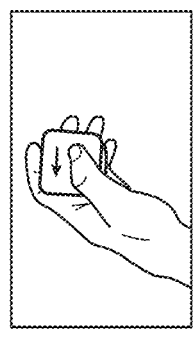
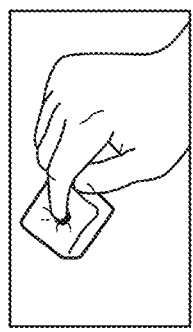
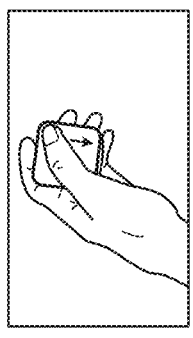
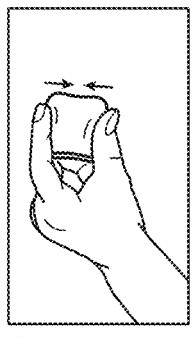
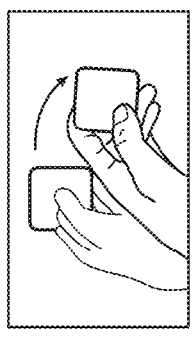
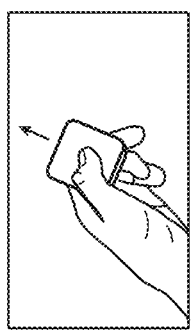
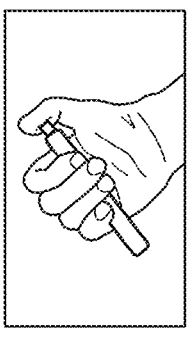
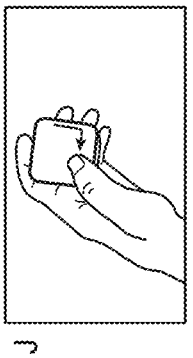
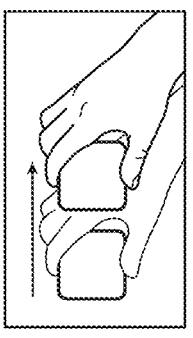
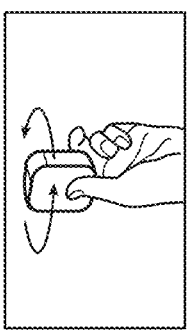
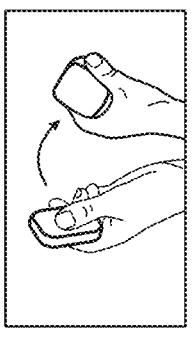
FIG. 8

A. 3-D App Interface
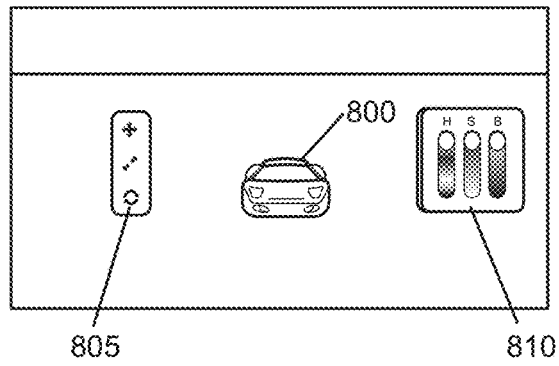
B. Tangible Controller Activation
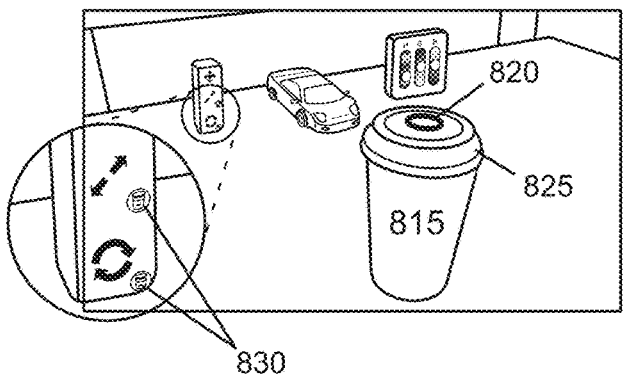
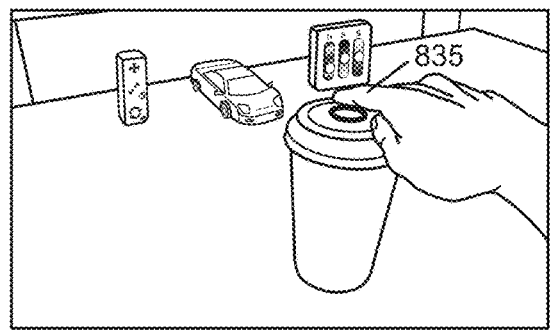
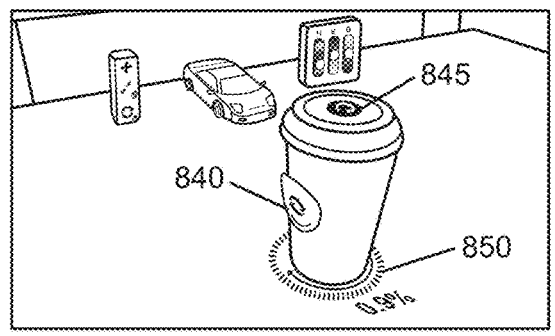
FIG. 12A C. Scaling the 3D Model
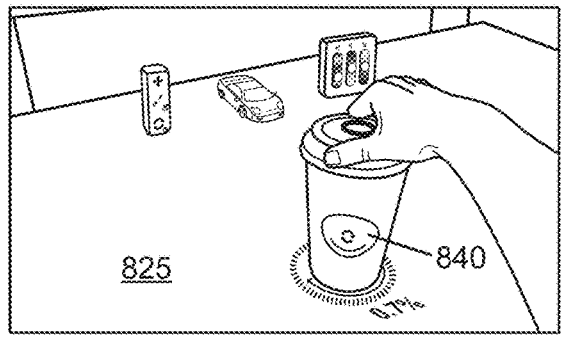
D. Rotating the 3D Model
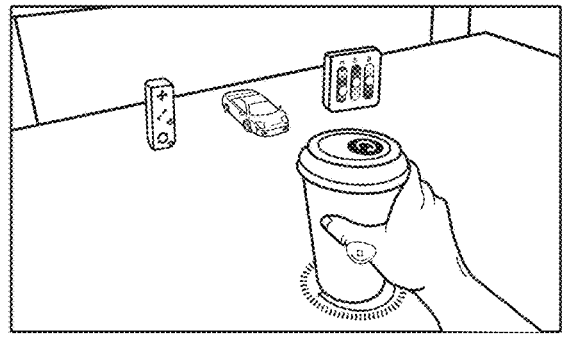
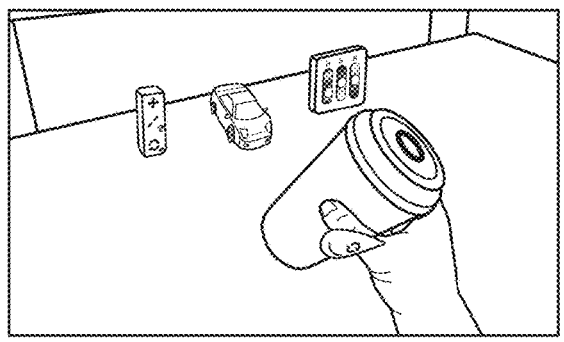
E. Resetting the 3D Model Transform
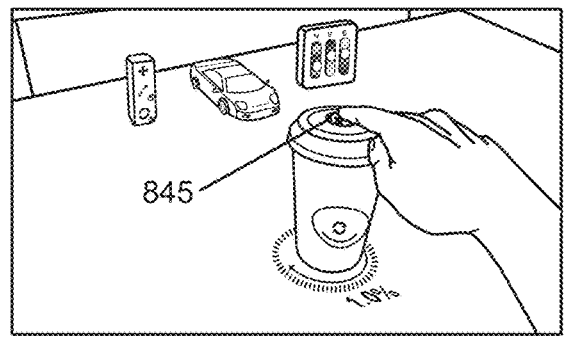
FIG. 12B F. Changing Color Values
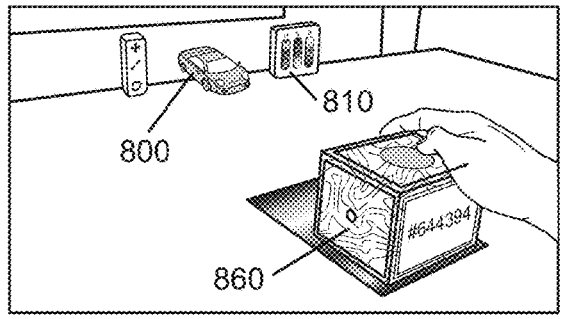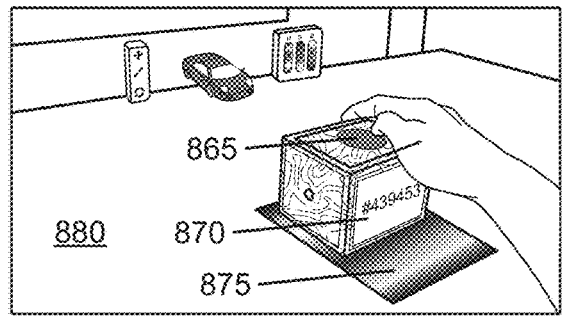
G. Switching between HSB Slider Controls
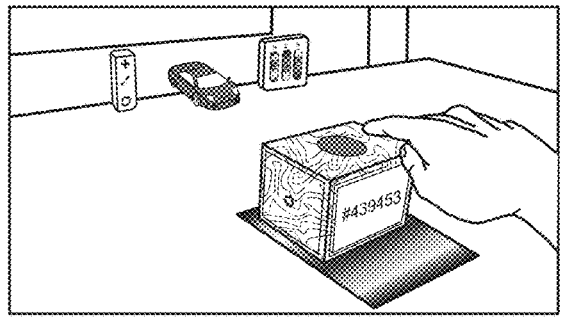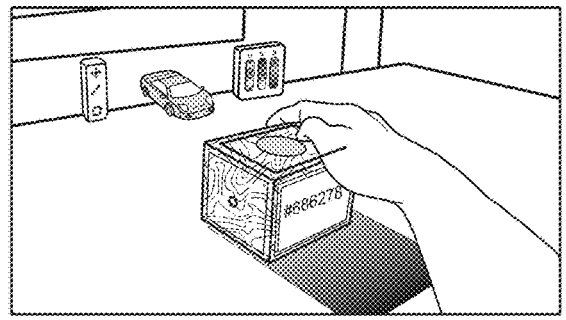
FIG. 12C

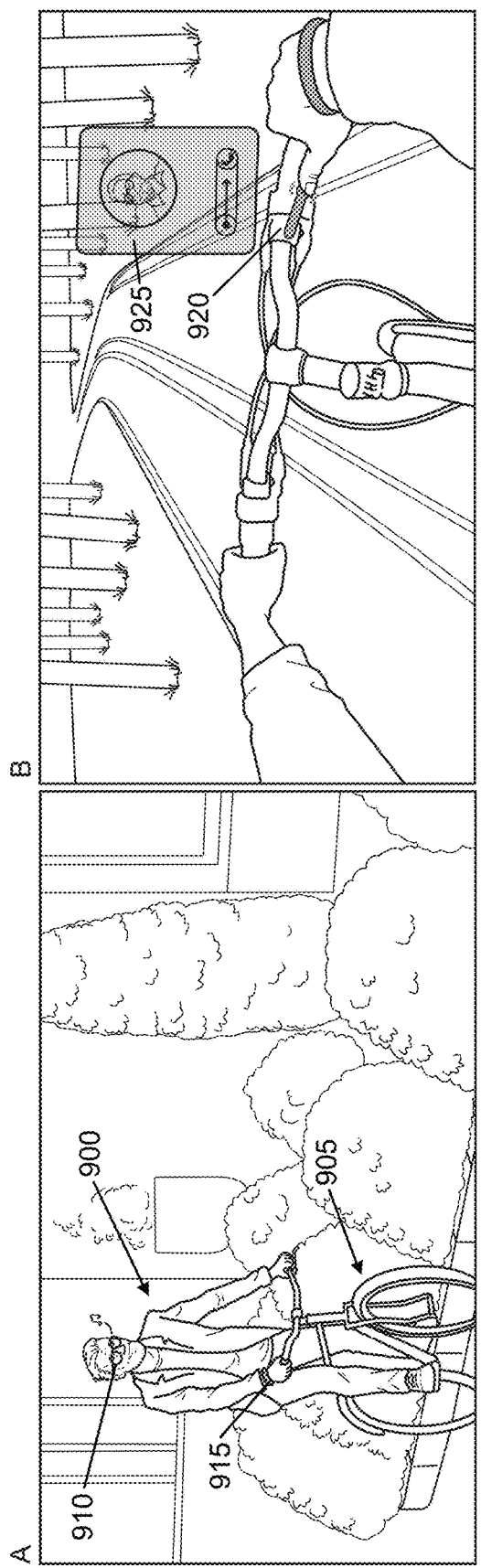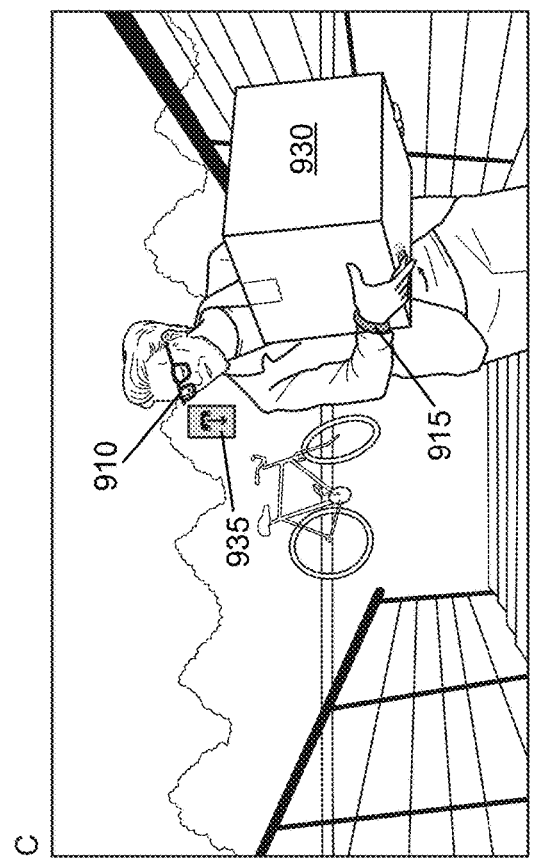
FIG. 13A

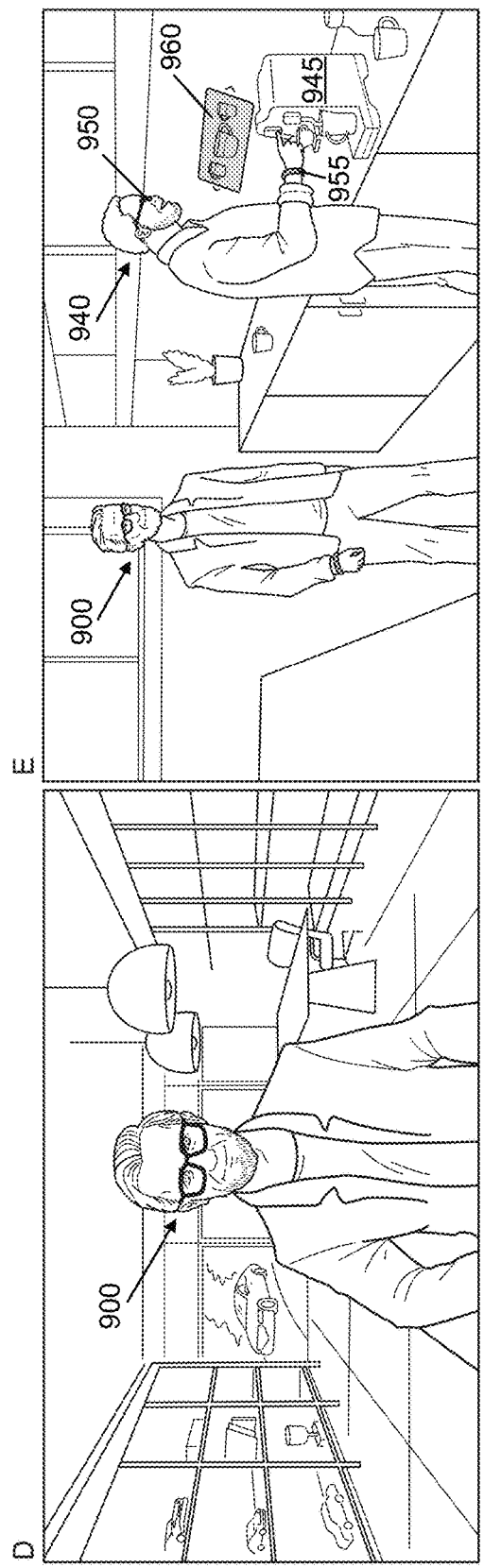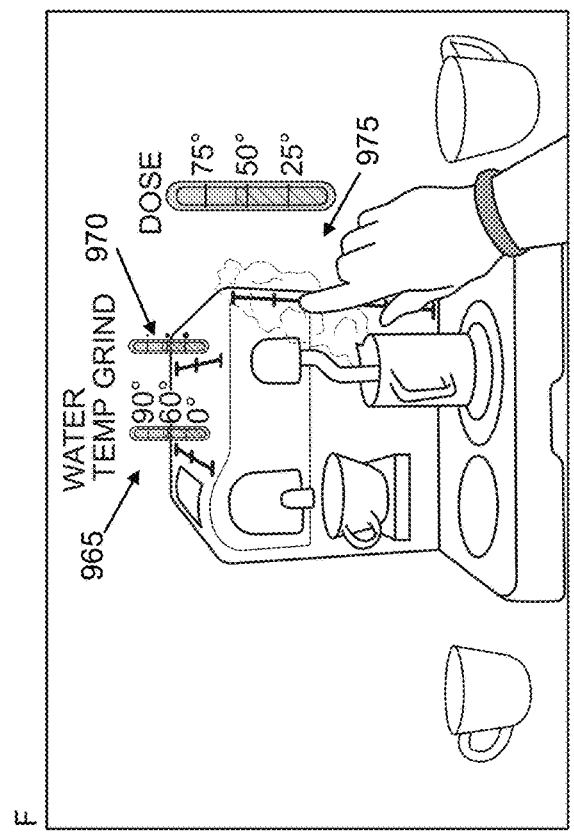
FIG. 13B

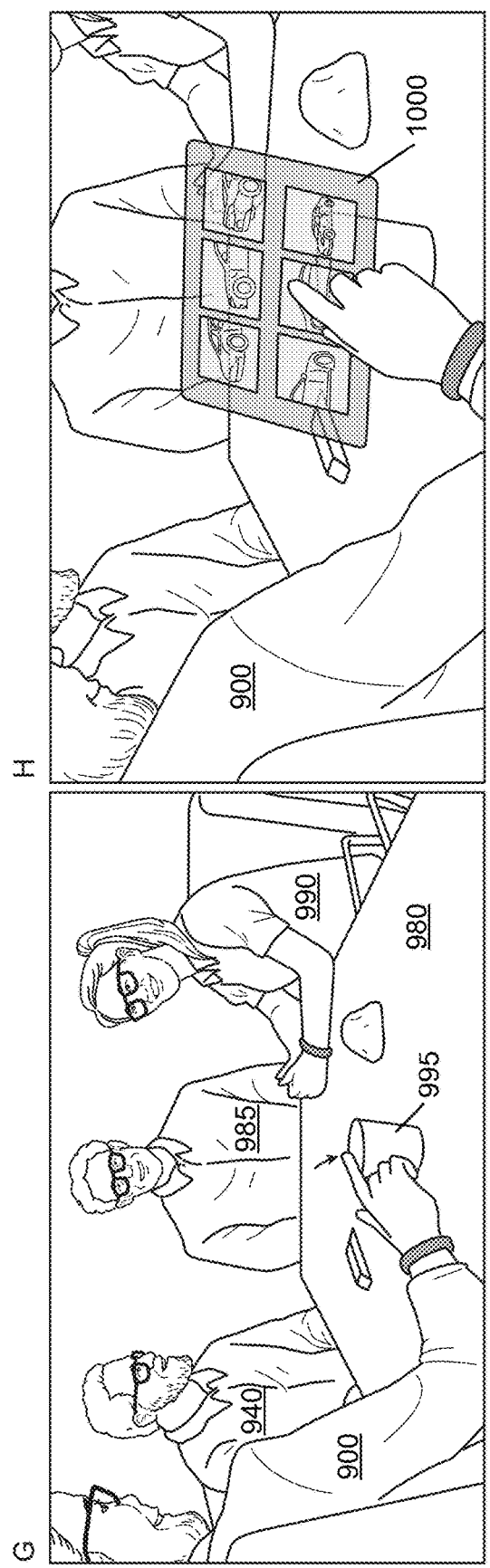
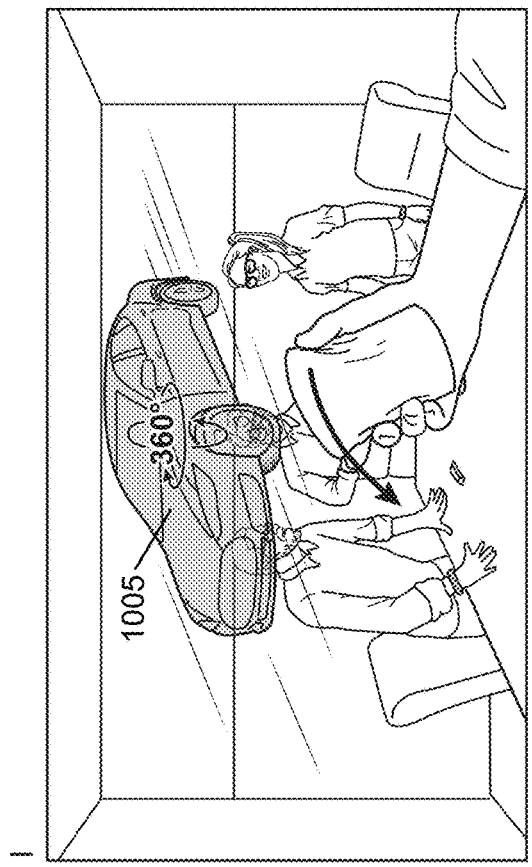
FIG. 13C

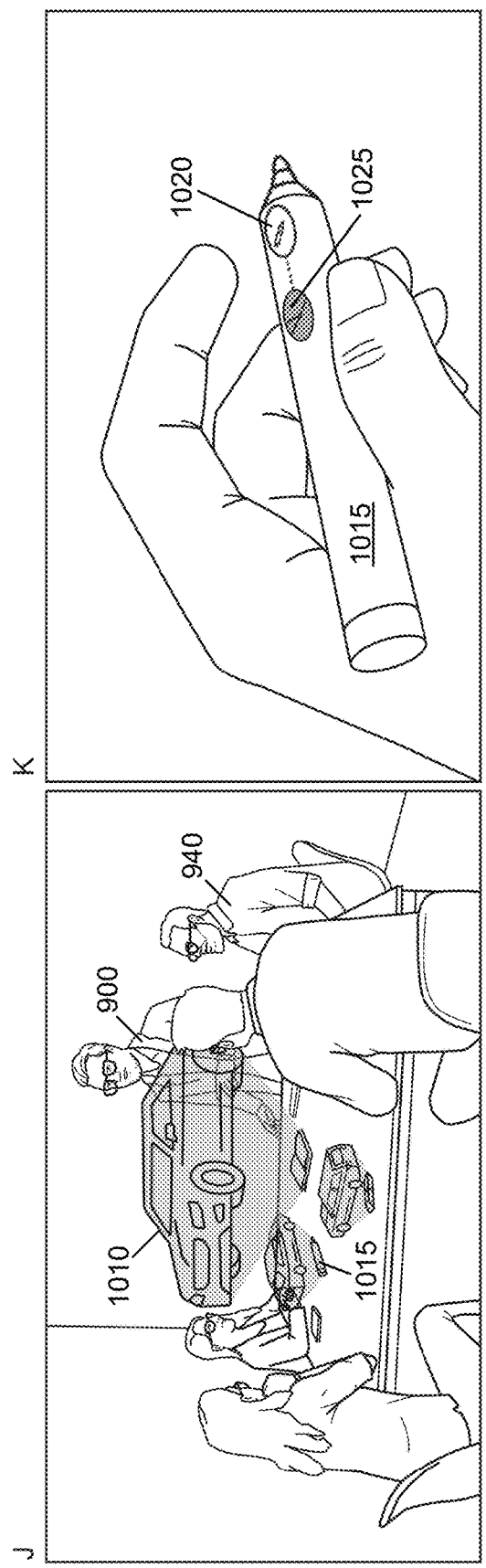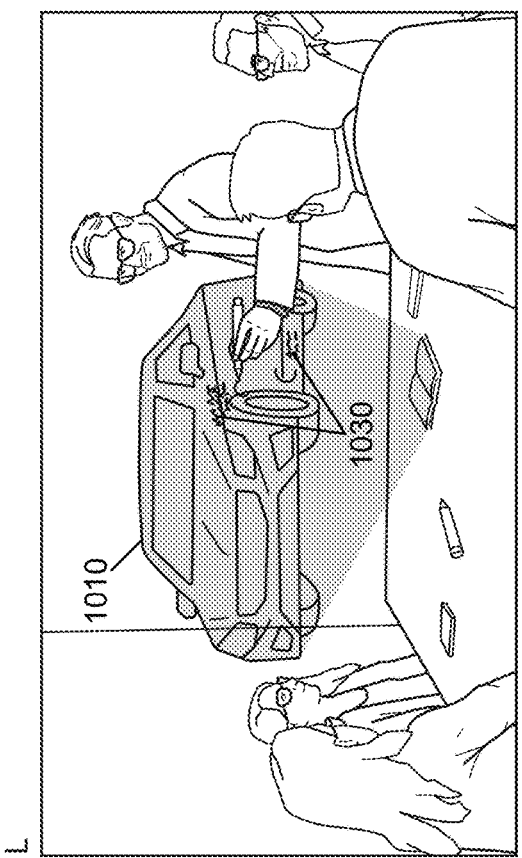
FIG. 13D

OPPORTUNISTIC ADAPTIVE TANGIBLE USER INTERFACES FOR USE IN EXTENDED REALITY ENVIRONMENTS

CROSS-REFERENCE TO RELATED APPLICATION

The present application is a non-provisional application of and claims the benefit and priority under 35 U.S.C. 119(e) of U.S. Provisional Application No. 63/374,861, filed Sep. 7, 2022, the entire contents of which is incorporated herein by reference for all purposes.

FIELD

The present disclosure relates generally to Opportunistic Tangible User Interfaces (TUI) in an extended reality environment, and more particularly, to techniques for implementing an Adaptive Tangible User Interface (ATUI) in which tangible interfaces are composed in real time based on identified affordances of existing objects in the physical environment and the input tasks of a user.

BACKGROUND

Extended reality is a form of reality that has been adjusted in some manner before presentation to a user, which may include, e.g., a virtual reality (VR), an augmented reality (AR), a mixed reality (MR), a hybrid reality, or some combination and/or derivatives thereof. Extended reality content may include completely generated virtual content or generated virtual content combined with physical content (e.g., physical or real-world objects). The extended reality content may include digital images or animation, text, video, audio, haptic feedback, or some combination thereof, and any of which may be presented in a single channel or in multiple channels (such as stereo video that produces a three-dimensional effect to the viewer). Extended reality may be associated with applications, products, accessories, services, or some combination thereof, that are, e.g., used to create content in an extended reality and/or used in (e.g., perform activities in) an extended reality. The extended reality system that provides such content may be implemented on various platforms, including a head-mounted display (HMD) connected to a host computer system, a standalone HMD, a mobile device or computing system, or any other hardware platform capable of providing extended reality content to one or more viewers.

Extended reality systems have enormous potential to provide interesting and useful content to users. However, as extended reality systems become more immersive, complex, and useful in additional settings, developers are increasingly seeking mechanisms that more effectively and efficiently allows users to interact with the extended reality environment. Current interactions between users and an extended reality environment typically occur through a purpose-built input device (e.g., computer mouse) or, for example, through mid-air hand gestures that have been adopted by several consumer VR and AR products. Unfortunately, the use of an input device such as a computer mouse does not foster a feeling of being connected to the extended reality environment and also requires a user to maintain possession of the device across different user locations, Input techniques such as mid-air hand gestures, while perhaps providing users with a more immersive virtual experience, return no tactile feedback to the user when interacting with virtual content. Thus, while extended reality systems have evolved considerably over time, there remains a need for a more convenient, intuitive, and adaptable way for users to interact with extended reality content.

Accordingly, developers face significant technical challenges in providing user interfaces that present content in ways that can be more easily and quickly understood by the user.

BRIEF SUMMARY

Techniques disclosed herein relate generally to the use of TUIs in an extended reality environment. More specifically and without limitation, techniques disclosed herein relate to implementing ATUIs in which tangible interfaces are composed on the fly based on detected affordances of existing objects in the physical environment of a user and an input task to be performed by the user. A system implementing an ATUI according to exemplary embodiments of the present disclosure can proactively scan the physical environment of a user to detect and identify new existing physical objects and can dynamically adjust the display of ATUIs to suit the changing context of user actions and locations. An appropriate UI can be mapped to one or more of the detected and identified physical objects such that the user can control devices, displays, etc., by manipulating a mapped physical object. For example, a UI may be presented on the body of a coffee machine to allow control of various coffee machine functions when touched (e.g., swiped) by a user. In another example, a UI may be mapped to a coffee cup sitting on a conference room table, and the coffee cup can be manipulated by a user to generate and control a holographic image.

In various embodiments, an extended reality system is provided comprising an extended reality device designed to be worn by a user, the extended reality device including a display for displaying content to the user in an extended reality environment, and one or more sensors to capture input data including images of a real-world environment within a visual field of the user; one or more processors; and one or more memories accessible to the one or more processors, the one or more memories storing a plurality of instructions that are executable by the one or more processors to cause the one or more processors to perform processing comprising: obtaining, using the input data from the one or more sensors, three-dimensional meshes representing geometry of the real-world environment within the visual field; identifying physical objects within the real-world environment based on the three-dimensional meshes; identifying object affordance factors available in the real-world environment; generating a set of possible object-based performable gestures afforded by the object affordance factors in the real-world environment; determining potential input tasks based on existing spatial user interfaces and a current intent of the user; composing one or more performable gestures for the potential input tasks based at least in part on the set of possible object-based performable gestures afforded by the object affordance factors available in the real-world environment and the determined potential input tasks; and selecting, based on the composed one or more performable gestures and the object affordance factors available in the real-world environment, an identified physical object for use as an adaptive tangible user interface in the extended reality environment.

In some embodiments, the extended reality device includes an eyewear device selected from the group consisting of a mixed reality headset and augmented reality glasses.

In some embodiments, the extended reality system further includes at least one external sensor that provides data regarding user movement or actions, wherein the at least one external sensor can be a wearable wristband.

In some embodiments, the object affordance factors are categorized based on one or more characteristics thereof.

In some embodiments, the object affordance factors are further divided into micro factor and macro factor sub-categories.

In some embodiments, the processing further comprises creating an affordance-based object taxonomy that categorizes a physical object in the real-world environment based on input gestures that are supportable by the physical object.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 5 is a table listing a taxonomy of object-based gestures spatial interaction in accordance with various embodiments.

FIG. 6 is a table listing various object affordance factors in accordance with various embodiments.

FIG. 7 is a table showing an affordance-based object taxonomy in accordance with various embodiments.

FIG. 8 illustrates the various object-based gestures identified in the table of FIG. 7.

FIGS. 12A-12C collectively present a story board illustrating a scenario in which a plurality of physical objects are implemented as ATUIs in an extended reality environment in accordance with various embodiments.

FIGS. 13A-13D collectively present another story board illustrating a scenario in which a plurality of physical objects are implemented as ATUIs in an extended reality environment in accordance with various embodiments.

DETAILED DESCRIPTION

Figure 1:
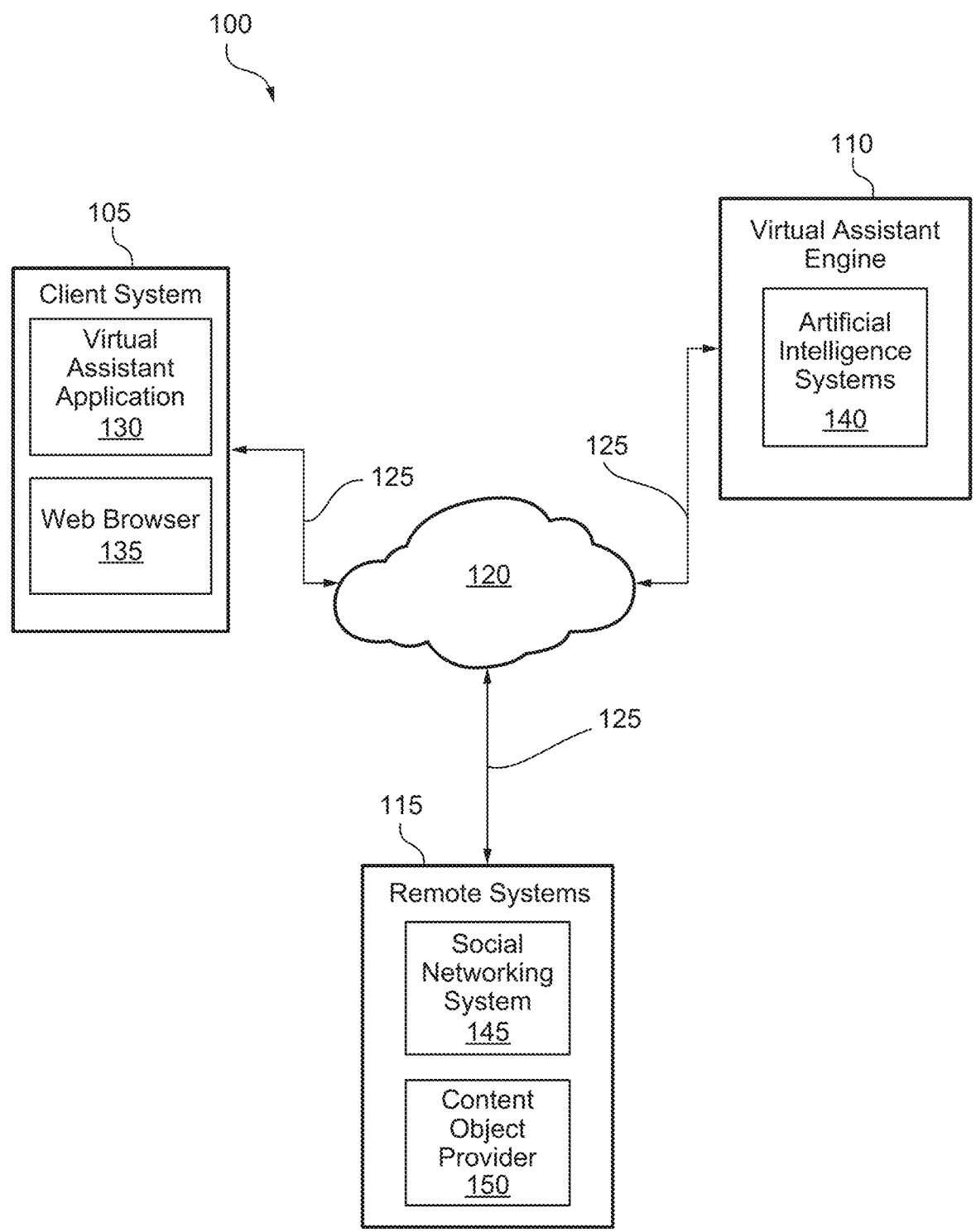
FIG. 1 is a simplified block diagram of a network environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Extended reality systems are becoming increasingly ubiquitous with applications in many fields such as computer gaming, health and safety, industrial, and education. As a few examples, extended reality systems are being incorporated into mobile devices, gaming consoles, personal computers, movie theaters, and theme parks. Typical extended reality systems include one or more devices for rendering and displaying content to users. As one example, an extended reality system may incorporate a head-mounted display (HMD) worn by a user and configured to output extended reality content to the user. The extended reality content may be generated in a wholly or partially simulated environment (extended reality environment) that users sense and/or interact with via an electronic system. The simulated environment may be a virtual reality (VR) environment, which is designed to be based entirely on computer-generated sensory inputs (e.g., virtual content) for one or more user senses, or a mixed reality (MR) environment, which is designed to incorporate sensory inputs (e.g., a view of the physical surroundings) from the physical environment, or a representation thereof, in addition to including computer-generated sensory inputs (e.g., virtual content). Examples of MR include augmented reality (AR) and augmented virtuality (AV). An AR environment is a simulated environment in which one or more virtual objects are superimposed over a physical environment, or a representation thereof, or a simulated environment in which a representation of a physical environment is transformed by computer-generated sensory information. An AV environment refers to a simulated environment in which a virtual or computer-generated environment incorporates one or more sensory inputs from the physical environment. In any instance—VR. MR, AR, or VR, during operation, the user typically interacts with the extended reality system to interact with extended reality content.

Extended reality systems can be used to facilitate interactions amongst users and objects within the virtual and/or physical world. For example, interfaces such as AR and VR glasses and HMDs have been developed to allow users to interact with spatial computing devices. As the nature of the spatial interface is three-dimensional, the use of mid-air hand gestures to interact with virtual content has become more common. But, mid-air hand gestures lack tangibility and do not provide a user with haptic feedback, which can result in numerous usability challenges. User interaction with virtual content through the manipulation of real world physical (tangible) objects is also possible. However, due to the abstract nature of the spatial interface, the past experience of users when interacting with tangible objects in the real world has thus far not translated well when using the same or similar objects to interact with extended reality content.

In order overcome these challenges and others, techniques are disclosed herein for composing opportunistic augmented tangible user interfaces (ATUIs) on the fly in an extended reality environment. According to said techniques, the ATUIs are opportunistic in the sense that existing physical objects in the real-world environment of a user can be automatically detected and identified, as can characteristics (affordances) of the objects. A determination as to whether a detected object may be suitable as a user interface may be determined based on, for example, the type of user actions to be performed in the extended reality environment and an affordance-based object taxonomy that indicates the object affordances required to accommodate the user gestures necessary to perform those actions. One or more appropriate UIs can then be created and mapped to one or more of the detected and identified existing objects such that the user can control devices or perform tasks within the extended reality environment through a logical manipulation of the mapped existing objects. New existing objects can be detected, identified and mapped with UIs as a user's surroundings change, and UIs mapped to existing objects can be adapted or updated to accommodate new or changing operations to be performed by a user in the extended reality environment.

In an exemplary embodiment, an extended reality system is provided comprising an extended reality device designed to be worn by a user, the extended reality device including a display for displaying content to the user in an extended reality environment, and one or more sensors to capture input data including images of a real-world environment within a visual field of the user; one or more processors; and one or more memories accessible to the one or more processors, the one or more memories storing a plurality of instructions that are executable by the one or more processors to cause the one or more processors to perform processing comprising: obtaining, using the input data from the one or more sensors, three-dimensional meshes representing geometry of the real-world environment within the visual field; identifying physical objects within the real-world environment based on the three-dimensional meshes; identifying object affordance factors available in the real-world environment; generating a set of possible object-based performable gestures afforded by the object affordance factors in the real-world environment; determining potential input tasks based on existing spatial user interfaces and a current intent of the user; composing one or more performable gestures for the potential input tasks based at least in part on the set of possible object-based performable gestures afforded by the object affordance factors available in the real-world environment and the determined potential input tasks; and selecting, based on the composed one or more performable gestures and the object affordance factors available in the real-world environment, an identified physical object for use as an adaptive tangible user interface in the extended reality environment.

Extended Reality System Overview

FIG. 1 illustrates an example network environment 100 associated with an extended reality system in accordance with aspects of the present disclosure. The network environment 100 includes a client system 105, a virtual assistant engine 110, and remote systems 115 connected to each other by a network 120. Although FIG. 1 illustrates a particular arrangement of a client system 105, a virtual assistant engine 110, remote systems 115, and a network 120, this disclosure contemplates any suitable arrangement of a client system 105, a virtual assistant engine 110, remote systems 115, and a network 120. As an example, and not by way of limitation, two or more of a client system 105, a virtual assistant engine 110, and remote systems 115 may be connected to each other directly, bypassing network 120. As another example, two or more of a client system 105, a virtual assistant engine 110, and remote systems 115 may be physically or logically co-located with each other in whole or in part. Moreover, although FIG. 1 illustrates a particular number of a client system 105, a virtual assistant engine 110, remote systems 115, and networks 120, this disclosure contemplates any suitable number of client systems 105, virtual assistant engines 110, remote systems 115, and networks 120. As an example, and not by way of limitation, network environment 100 may include multiple client systems 105, virtual assistant engines 110, remote systems 115, and networks 120.

This disclosure contemplates any suitable network 120. As an example and not by way of limitation, one or more portions of a network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 120 may include one or more networks 120.

Links 125 may connect a client system 105, a virtual assistant engine 110, and remote systems 115 to a communication network or to each other. This disclosure contemplates any suitable links 125. In particular embodiments, one or more links 125 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 125 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 125, or a combination of two or more such links 125. Links 125 need not necessarily be the same throughout a network environment 100. One or more first links 125 may differ in one or more respects from one or more second links 125.

In various embodiments, a client system 105 is an electronic device including hardware, software, or embedded logic components or a combination of two or more such components and capable of carrying out the appropriate extended reality functionalities in accordance with techniques of the disclosure. As an example, and not by way of limitation, a client system 105 may include a desktop computer, notebook or laptop computer, netbook, a tablet computer, e-book reader, GPS device, camera, personal digital assistant (PDA), handheld electronic device, cellular telephone, smartphone, a VR. MR, AR, or VR headset such as an AR/VR HMD, other suitable electronic devices capable of displaying extended reality content, or any suitable combination thereof. In particular embodiments, the client system 105 is an AR/VR HMD as described in detail with respect to FIG. 2. This disclosure contemplates any suitable client system 105 configured to generate and output extended reality content to the user. The client system 105 may enable its user to communicate with other users at other client systems 105.

In various embodiments, the client system 105 includes a virtual assistant application 130. The virtual assistant application 130 instantiates at least a portion of the virtual assistant, which can provide information or services to a user based on a combination of user input, contextual awareness (such as clues from the physical environment or clues from user behavior), and the capability to access information from a variety of online sources (such as weather conditions, traffic information, news, stock prices, user schedules, retail prices, etc.). The user input may include text (e.g., online chat), especially in an instant messaging application or other applications, voice, eye-tracking, user motion such as gestures or running, or a combination of them. The virtual assistant may perform concierge-type services (e.g., making dinner reservations, purchasing event tickets, making travel arrangements, and the like), provide information (e.g., reminders, information concerning an object in an environment, information concerning a task or interaction, answers to questions, training regarding a task or activity, and the like), goal assisted services (e.g., generating and implementing an exercise regimen to achieve a certain level of fitness or weight loss, implementing electronic devices such as lights, heating, ventilation, and air conditioning systems, coffee maker, television, etc., generating and executing a morning routine such as wake up, get ready for work, make breakfast, and travel to work, and the like), or combinations thereof. The virtual assistant may also perform management or data-handling tasks based on online information and events without user initiation or interaction. Examples of those tasks that may be performed by a virtual assistant may include schedule management (e.g., sending an alert to a dinner date that a user is running late due to traffic conditions, update schedules for both parties, and change the restaurant reservation time). The virtual assistant may be enabled in an extended reality environment by a combination of the client system 105, the virtual assistant engine 110, application programming interfaces (APIs), and the proliferation of applications on user devices such as the remote systems 115.

A user at the client system 105 may use the virtual assistant application 130 to interact with the virtual assistant engine 110. In some instances, the virtual assistant application 130 is a stand-alone application or may be integrated into another application such as a social-networking application or another suitable application (e.g., an artificial simulation application). In some instances, the virtual assistant application 130 is integrated into the client system 105 (e.g., part of the operating system of the client system 105), an assistant hardware device, or any other suitable hardware devices. In some instances, the virtual assistant application 130 may be accessed via a web browser 135. In some instances, the virtual assistant application 130 passively listens to and watches interactions of the user in the real-world, and processes what it hears and sees (e.g., explicit input such as audio commands or interface commands, contextual awareness derived from audio or physical actions of the user, objects in the real-world, environmental triggers such as weather or time, and the like) in order to interact with the user in an intuitive manner.

In particular embodiments, the virtual assistant application 130 receives or obtains input from a user, the physical environment, a virtual reality environment, or a combination thereof via different modalities. As an example, and not by way of limitation, the modalities may include audio, text, image, video, motion, graphical or virtual user interfaces, orientation, sensors, etc. The virtual assistant application 130 communicates the input to the virtual assistant engine 110. Based on the input, the virtual assistant engine 110 analyzes the input and generates responses (e.g., text or audio responses, device commands such as a signal to turn on a television, virtual content such as a virtual object, or the like) as output. The virtual assistant engine 110 may send the generated responses to the virtual assistant application 130, the client system 105, the remote systems 115, or a combination thereof. The virtual assistant application 130 may present the response to the user at the client system 105 (e.g., rendering virtual content overlaid on a real-world object within the display). The presented responses may be based on different modalities such as audio, text, image, and video. As an example, and not by way of limitation, context concerning activity of a user in the physical world may be analyzed and determined to initiate an interaction for completing an immediate task or goal, which may include the virtual assistant application 130 retrieving traffic information (e.g., via a remote system 115). The virtual assistant application 130 may communicate the request for "traffic information" to the virtual assistant engine 110. The virtual assistant engine 110 may accordingly contact a remote system 115 and retrieve traffic information as a result of the request, and subsequently send the retrieved traffic information back to the virtual assistant application 130. The virtual assistant application 130 may then present the traffic information to the user as text (e.g., as virtual content overlaid on the physical environment such as a real-world object) or audio (e.g., spoken to the user in natural language through a speaker associated with the client system 105).

In various embodiments, the virtual assistant engine 110 assists users to retrieve information from various sources, request services from different service providers, assist users to learn or complete goals and tasks using various sources and/or service providers, and combinations thereof. In some instances, the virtual assistant engine 110 receives input data from the virtual assistant application 130 and determines one or more interactions based on the input data that could be executed to request information, services, and/or complete a goal or task of the user. The interactions are actions that could be presented to a user for execution in an extended reality environment. In some instances, the interactions are influenced by other actions associated with the user. The interactions are aligned with goals or tasks associated with the user. The goals may comprise, for example, long term goals such as being fit, intermediate goals such as completing a weekly exercise challenge, and immediate goals such as completing today's exercise regimen. Each goal may be associated with a workflow of actions or tasks for achieving the goal. For example, for today's exercise regimen, the workflow of actions or tasks may comprise possible classes or programs for completing today's exercise regimen, the individual exercises to be performed for the classes or programs, the repetition, sets, and/or time associated with performing each exercise, and any equipment need for each of the exercises.

The virtual assistant engine 110 may use artificial intelligence systems 140 (e.g., rule-based systems or machine-learning based systems such as natural-language understanding models) to analyze the input based on a user's profile and other relevant information. The result of the analysis may comprise different interactions associated with a task or goal of the user. The virtual assistant engine 110 may then retrieve information, request services, and/or generate instructions, recommendations, or virtual content associated with one or more of the different interactions for completing tasks or goals. In some instances, the virtual assistant engine 110 interacts with a remote system 115 such as a social-networking system 145 when retrieving information, requesting service, and/or generating instructions or recommendations for the user. The virtual assistant engine 110 may generate virtual content for the user using various techniques such as natural-language generating, virtual object rendering, and the like. The virtual content may comprise, for example, the retrieved information, the status of the requested services, a virtual object such as a glimmer overlaid on a physical object such as a bicycle, light, or yoga mat, a modeled pose for an exercise, and the like. In particular embodiments, the virtual assistant engine 110 enables the user to interact with it regarding the information, services, or goals using a graphical or virtual interface, a stateful and multi-turn conversation using dialog-management techniques, and/or a stateful and multi-action interaction using task-management techniques.

In various embodiments, a remote system 115 may include one or more types of servers, one or more data stores, one or more interfaces, including but not limited to APIs, one or more web services, one or more content sources, one or more networks, or any other suitable components, e.g., that servers may communicate with. A remote system 115 may be operated by a same entity or a different entity from an entity operating the virtual assistant engine 110. In particular embodiments, however, the virtual assistant engine 110 and third-party remote systems 115 may operate in conjunction with each other to provide virtual content to users of the client system 105. For example, a social-networking system 145 may provide a platform, or backbone, which other systems, such as third-party systems, may use to provide social-networking services and functionality to users across the Internet, and the virtual assistant engine 110 may access these systems to provide virtual content on the client system 105.

In particular embodiments, the social-networking system 145 may be a network-addressable computing system that can host an online social network. The social-networking system 145 may generate, store, receive, and send social-networking data, such as, for example, user-profile data, concept-profile data, social-graph information, or other suitable data related to the online social network. The social-networking system 145 may be accessed by the other components of network environment 100 either directly or via a network 120. As an example, and not by way of limitation, a client system 105 may access the social-networking system 145 using a web browser 135, or a native application associated with the social-networking system 145 (e.g., a mobile social-networking application, a messaging application, another suitable application, or any combination thereof) either directly or via a network 120. The social-networking system 145 may provide users with the ability to take actions on various types of items or objects, supported by the social-networking system 145. As an example, and not by way of limitation, the items and objects may include groups or social networks to which users of the social-networking system 145 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 145 or by an external system of the remote systems 115, which is separate from the social-networking system 145 and coupled to the social-networking system 145 via the network 120.

The remote system 115 may include a content object provider 150. A content object provider 150 includes one or more sources of virtual content objects, which may be communicated to the client system 105. As an example, and not by way of limitation, virtual content objects may include information regarding things or activities of interest to the user, such as, for example, movie show times, movie reviews, restaurant reviews, restaurant menus, product information and reviews, instructions on how to perform various tasks, exercise regimens, cooking recipes, or other suitable information. As another example, and not by way of limitation, content objects may include incentive content objects, such as coupons, discount tickets, gift certificates, or other suitable incentive objects. As another example, and not by way of limitation, content objects may include virtual objects such as virtual interfaces, 2D or 3D graphics, media content, or other suitable virtual objects.

Figure 2A:
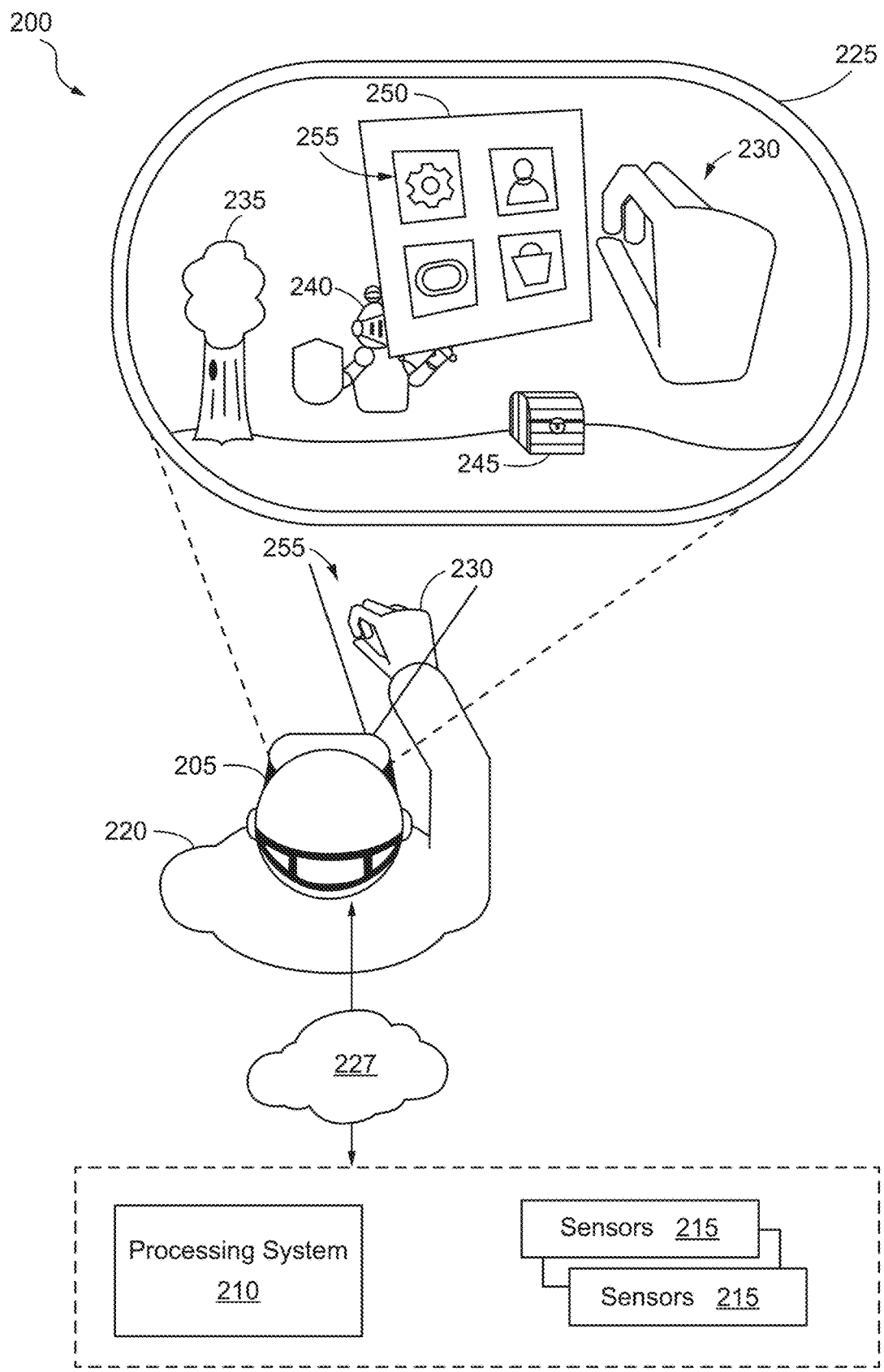
FIG. 2A an illustration depicting an example extended reality system that presents and controls user interface elements within an extended reality environment in accordance with various embodiments.

FIG. 2A illustrates an example of a client system 200 (e.g., client system 105 described with respect to FIG. 1) in accordance with aspects of the present disclosure. Client system 200 includes an extended reality system 205 (e.g., a HMD), a processing system 210, and one or more sensors 215. As shown, the extended reality system 205 is typically worn by a user 220 and comprises an electronic display (e.g., a transparent, translucent, or solid display), optional controllers, and an optical assembly for presenting extended reality content 225 to the user 220. The one or more sensors 215 may include motion sensors (e.g., accelerometers) for tracking motion of the extended reality system 205 and may include one or more image capture devices (e.g., cameras, line scanners) for capturing image data of the surrounding physical environment. In this example, the processing system 210 is shown as a single computing device, such as a gaming console, a workstation, a desktop computer, or a laptop. In other examples, the processing system 210 may be distributed across a plurality of computing devices, such as a distributed computing network, a data center, or a cloud computing system. In other examples, the processing system 210 may be integrated with the HMD 205. The extended reality system 205, the processing system 210, and the one or more sensors 215 are communicatively coupled via a network 227, which may be a wired or wireless network, such as Wi-Fi, a mesh network, a short-range wireless communication medium such as Bluetooth wireless technology, or a combination thereof. Although the extended reality system 205 is shown in this example as in communication with, e.g., tethered to or in wireless communication with, the processing system 210, in some implementations the extended reality system 205 operates as a stand-alone, mobile extended reality system.

In general, the client system 200 uses information captured from a real-world, physical environment to render extended reality content 225 for display to the user 220. In the example of FIG. 2, the user 220 views the extended reality content 225 constructed and rendered by an extended reality application executing on the processing system 210 and/or the extended reality system 205. In some examples, the extended reality content 225 viewed through the extended reality system 205 comprises a mixture of real-world imagery (e.g., the user's hand 230 and physical objects 235) and virtual imagery (e.g., virtual content such as information or objects 240, 245 and a virtual user interface 250) to produce mixed reality and/or augmented reality. In some examples, virtual information or objects 240, 245 may be mapped (e.g., pinned, locked, placed) to a particular position within the extended reality content 225. For example, a position for virtual information or objects 240, 245 may be fixed, as relative to a wall of a residence or the surface of the earth, for instance. A position for virtual information or objects 240, 245 may instead be variable, as relative to a physical object 235 or the user 220, for instance. In some examples, the particular position of virtual information or objects 240, 245 within the extended reality content 225 is associated with a position within the real world, physical environment (e.g., on a surface of a physical object 235).

In the example shown in FIG. 2A, virtual information or objects 240, 245 are mapped at a position relative to a physical object 235. As should be understood, the virtual imagery (e.g., virtual content such as information or objects 240, 245 and virtual user interface 250) does not exist in the real-world, physical environment. The virtual user interface 250 may be fixed, as relative to the user 220, the user's hand 230, physical objects 235, or other virtual content such as virtual information or objects 240, 245, for instance. As a result, the client system 200 renders, at a user interface position that is locked relative to a position of the user 220, the user's hand 230, physical objects 235, or other virtual content in the extended reality environment, the virtual user interface 250 for display at extended reality system 205 as part of extended reality content 225. As used herein, a virtual element 'locked' to a position of virtual content or a physical object is rendered at a position relative to the position of the virtual content or physical object so as to appear to be part of or otherwise tied in the extended reality environment to the virtual content or the physical object.

In some implementations, the client system 200 generates and renders virtual content (e.g., GIFs, photos, applications, live-streams, videos, text, a web-browser, drawings, animations, representations of data files, or any other visible media) on a virtual surface. A virtual surface may be associated with a planar or other real-world surface (e.g., the virtual surface corresponds to and is locked to a physical surface, such as a wall table, or ceiling). In the example shown in FIG. 2A, the virtual surface is associated with the sky and ground of the physical environment. In other examples, a virtual surface can be associated with a portion of a real-world surface (e.g., a portion of the wall). In some examples, only the virtual content items contained within a virtual surface are rendered. In other examples, the virtual surface is generated and rendered (e.g., as a virtual plane or as a border corresponding to the virtual surface). In some examples, a virtual surface can be rendered as floating in a virtual or real-world physical environment (e.g., not associated with a particular real-world surface). The client system 200 may render one or more virtual content items in response to a determination that at least a portion of the location of virtual content items is in a field of view of the user 220. For example, the client system 200 may render the virtual user interface 250 only if a given physical object (e.g., a lamp) is within the field of view of the user 220.

During operation, the extended reality application constructs extended reality content 225 for display to the user 220 by tracking and computing interaction information (e.g., yoga pose information) for a frame of reference, typically a viewing perspective of the extended reality system 205. Using the extended reality system 205 as a frame of reference, and based on a current field of view as determined by a current estimated interaction of the extended reality system 205, the extended reality application renders extended reality content 225 which, in some examples, may be overlaid, at least in part, upon the real-world, physical environment of the user 220. During this process, the extended reality application uses sensed data received from the extended reality system 205 and the sensors 215, such as movement information, contextual awareness, and/or user commands. In some examples, the extended reality system 205 may also use data from any external sensors, such as third-party information or devices, to capture information within the real world, physical environment, such as motion by the user 220 and/or feature tracking information with respect to the user 220. Based on the sensed data, the extended reality application determines interaction information to be presented for the frame of reference of the extended reality system 205 and, in accordance with the current context of the user 220, renders the extended reality content 225.

The client system 200 may trigger generation and rendering of virtual content based on a current field of view of the user 220, as may be determined by real-time gaze 255 tracking of the user, or other conditions. More specifically, image capture devices of the sensors 215 capture image data representative of objects in the real world, physical environment that are within a field of view of image capture devices. During operation, the client system 200 performs object recognition within image data captured by the image capture devices of the extended reality system 205 to identify objects in the physical environment such as the user 220, the user's hand 230, and/or physical objects 235. Further, the client system 200 tracks the position, orientation, and configuration of the objects in the physical environment over a sliding window of time. Field of view typically corresponds with the viewing perspective of the extended reality system 205. In some examples, the extended reality application presents extended reality content 225 comprising mixed reality and/or augmented reality.

As illustrated in FIG. 2A, the extended reality application may render virtual content, such as virtual information or objects 240, 245 on a transparent display such that the virtual content is overlaid on real-world objects, such as the portions of the user 220, the user's hand 230, and/or physical objects 235, that are within a field of view of the user 220. In other examples, the extended reality application may render images of real-world objects, such as the portions of the user 220, the user's hand 230, and/or physical objects 235, that are within a field of view along with virtual objects, such as virtual information or objects 240, 245 within extended reality content 225. In other examples, the extended reality application may render virtual representations of the portions of the user 220, the user's hand 230, and/or physical objects 235 that are within field of view (e.g., render real-world objects as virtual objects) within extended reality content 225. In any case, the user 220 is able to view the portions of the user 220, the user's hand 230, the physical objects 235 and/or any other real-world objects or virtual content that are within field of view within the extended reality content 225. In other examples, the extended reality application may not render representations of the user 220 and the user's hand 230, but instead, render only the physical objects 235 and/or the virtual information or objects 240, 245.

In various embodiments, the client system 200 renders to the extended reality system 205, extended reality content 225 in which the virtual user interface 250 is locked relative to a position of the user 220, the user's hand 230, the physical objects 235, or other virtual content in the extended reality environment. That is, the client system 205 may render the virtual user interface 250 having one or more virtual user interface elements at a position and orientation that is based on and corresponds to the position and orientation of the user 220, the user's hand 230, the physical objects 235, or other virtual content in the extended reality environment. For example, if a physical object is positioned in a vertical position on a table, the client system 200 may render the virtual user interface 250 at a location corresponding to the position and orientation of the physical object in the extended reality environment. Alternatively, if the user's hand 230 is within the field of view, the client system 200 may render the virtual user interface at a location corresponding to the position and orientation of the user's hand 230 in the extended reality environment. Alternatively, if other virtual content is within the field of view, the client system 200 may render the virtual user interface at a location corresponding to a general predetermined position of the field of view (e.g., a bottom of the field of view) in the extended reality environment. Alternatively, if other virtual content is within the field of view, the client system 200 may render the virtual user interface at a location corresponding to the position and orientation of the other virtual content in the extended reality environment. In this way, the virtual user interface 250 being rendered in the virtual environment may track the user 220, the user's hand 230, the physical objects 235, or other virtual content such that the user interface appears, to the user, to be associated with the user 220, the user's hand 230, the physical objects 235, or other virtual content in the extended reality environment.

Figure 2B:
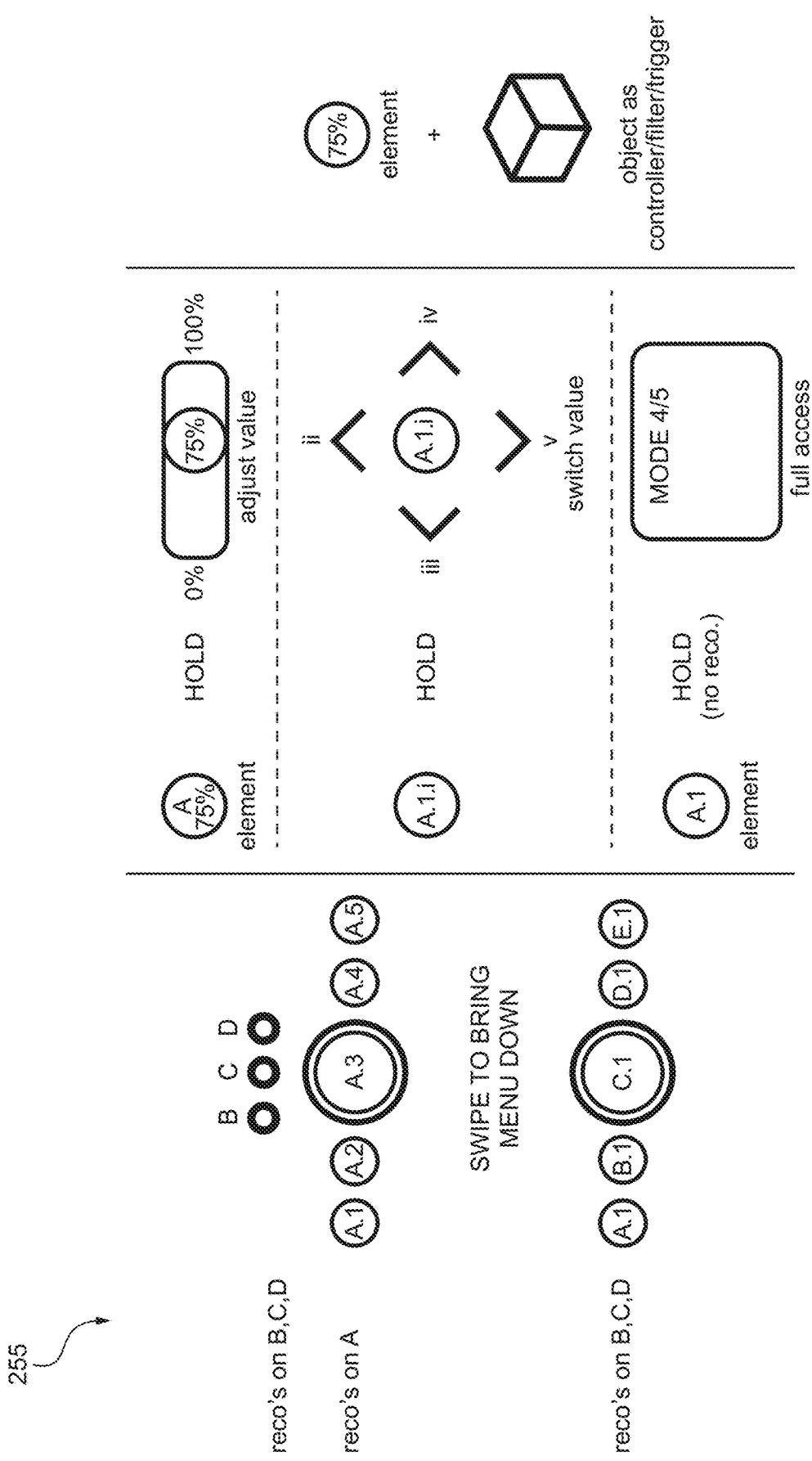
FIG. 2B an illustration depicting user interface elements in accordance with various embodiments.

The virtual user interface 250 includes one or more virtual user interface elements 255, as shown in FIG. 2B. Virtual user interface elements 255 may include, for instance, a virtual drawing interface, a selectable menu (e.g., a drop-down menu), virtual buttons, a virtual slider or scroll bar, a directional pad, a keyboard, or other user-selectable user interface elements, glyphs, display elements, content, user interface controls, and so forth. The particular virtual user interface elements 255 for the virtual user interface 250 may be context-driven based on the current extended reality applications with which the user 220 is engaged or real-world actions/tasks being performed by the user 220. When a user performs a user interface gesture in the extended reality environment at a location that corresponds to one of the virtual user interface elements 255 of the virtual user interface 250, the client system 200 detects the gesture relative to the virtual user interface elements 255 and performs an action associated with the gesture and the virtual user interface elements 255. For example, the user 220 may gesture a finger press at a button element 255 location on the virtual user interface 250. The button element 255 and/or the virtual user interface 250 location may or may not be overlaid on the user 220, the user's hand 230, the physical objects 235, or other virtual content, e.g., correspond to a position in the physical environment such as on a light switch or controller at which the client system 200 renders the virtual user interface button. In this example, the client system 200 detects the virtual button press gesture and performs an action corresponding to the detected virtual button press (e.g., turns on a light). The client system 200 may also, for instance, animate a press of the virtual user interface button along with the button press gesture.

The client system 200 may detect user interface gestures and other gestures using an inside-out or outside-in tracking system of image capture devices and or external cameras. The client system 200 may alternatively, or in addition, detect user interface gestures and other gestures using a presence-sensitive surface. That is, a presence-sensitive interface of the extended reality system 205 and/or controller may receive user inputs that make up a user interface gesture. The extended reality system 205 and/or controller may provide haptic feedback to touch-based user interaction by having a physical surface with which the user can interact (e.g., touch, drag a finger across, grab, and so forth). In addition, peripheral extended reality system 205 and/or controller may output other indications of user interaction using an output device. For example, in response to a detected press of a virtual user interface button, the extended reality system 205 and/or controller may output a vibration or "click" noise, or the extended reality system 205 and/or controller may generate and output content to a display. In some examples, the user 220 may press and drag their finger along physical locations on the extended reality system 205 and/or controller corresponding to positions in the virtual environment at which the client system 200 renders the virtual user interface elements 255 of the virtual user interface 250. In this example, the client system 200 detects this gesture and performs an action according to the detected press and drag of the virtual user interface elements 255, such as by moving a slider bar in the virtual environment. In this way, client system 200 simulates movement of virtual content using the virtual user interface elements 255 and gestures.

Various embodiments disclosed herein may include or be implemented in conjunction with various types of extended reality systems. Extended reality content generated by the extended reality systems may include completely computer-generated content or computer-generated content combined with captured (e.g., real-world) content. The extended reality content may include video, audio, haptic feedback, or some combination thereof, any of which may be presented in a single channel or in multiple channels (such as stereo video that produces a three-dimensional (3D) effect to the viewer). Additionally, in some embodiments, extended reality may also be associated with applications, products, accessories, services, or some combination thereof, that are used to, for example, create content in an extended reality and/or are otherwise used in (e.g., to perform activities in) an extended reality.

The extended reality systems may be implemented in a variety of different form factors and configurations. Some extended reality systems may be designed to work without near-eye displays (NEDs). Other extended reality systems may include an NED that also provides visibility into the real world (such as, e.g., augmented reality system 300 in FIG. 3A) or that visually immerses a user in an extended reality (such as, e.g., virtual reality system 350 in FIG. 3B). While some extended reality devices may be self-contained systems, other extended reality devices may communicate and/or coordinate with external devices to provide an extended reality experience to a user. Examples of such external devices include handheld controllers, mobile devices, desktop computers, devices worn by a user, devices worn by one or more other users, and/or any other suitable external system.

Figure 3A:
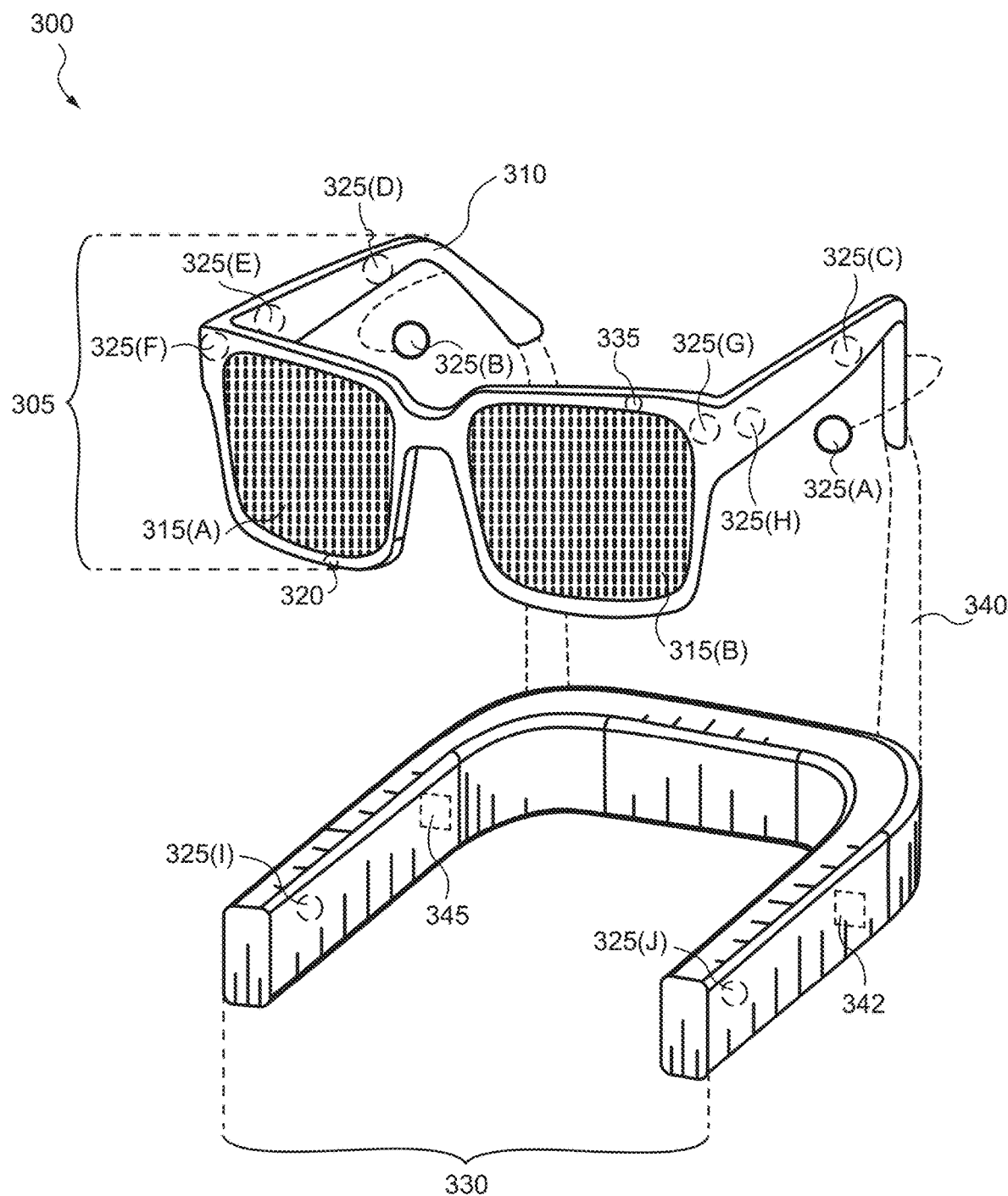
FIG. 3A is an illustration of an augmented reality system in accordance with various embodiments.

As shown in FIG. 3A, an augmented reality system 300 may include an eyewear device 305 with a frame 310 configured to hold a left display device 315(A) and a right display device 315(B) in front of a user's eyes. Display devices 315(A) and 315(B) may act together or independently to present an image or series of images to a user. While augmented reality system 300 includes two displays, embodiments of this disclosure may be implemented in augmented reality systems with a single NED or more than two NEDs.

In some embodiments, the augmented reality system 300 may include one or more sensors, such as a sensor 320 located on the frame 310. The sensor 320 may generate measurement signals in response to motion of the augmented reality system 300 and may be located on substantially any portion of the frame 310. The sensor 320 may represent one or more of a variety of different sensing mechanisms, such as a position sensor, an inertial measurement unit (IMU), a depth camera assembly, a structured light emitter and/or detector, or any combination thereof. In some embodiments, the augmented reality system 300 may or may not include the sensor 320 or may include more than one sensor. In embodiments in which the sensor 320 includes an IMU, the IMU may generate calibration data based on measurement signals from the sensor 320. Examples of the sensor 320 may include, without limitation, accelerometers, gyroscopes, magnetometers, other suitable types of sensors that detect motion, sensors used for error correction of the IMU, or some combination thereof.

In some examples, the augmented reality system 300 may also include a microphone array with a plurality of acoustic transducers 325(A)-325(J), referred to collectively as acoustic transducers 325. The acoustic transducers 325 may represent transducers that detect air pressure variations induced by sound waves. Each of the acoustic transducers 325 may be configured to detect sound and convert the detected sound into an electronic format (e.g., an analog or digital format). The microphone array in FIG. 3A may include, for example, ten acoustic transducers: acoustic transducers 325(A) and 325(B), which may be designed to be placed inside a corresponding ear of the user, acoustic transducers 325(C), 325(D), 325(E), 325(F), 325(G), and 325(H), which may be positioned at various locations on the frame 310, and/or acoustic transducers 325(I) and 325(J), which may be positioned on a corresponding neckband 330.

In some embodiments, one or more of the acoustic transducers 325 may be used as output transducers (e.g., speakers). For example, the acoustic transducers 325(A) and/or 325(B) may be earbuds or any other suitable type of headphone or speaker. The configuration of the acoustic transducers 325 of the microphone array may vary. While the augmented reality system 300 is shown in FIG. 3 as having ten acoustic transducers 325, the number of acoustic transducers 325 may be greater or less than ten. In some embodiments, using a greater number of acoustic transducers 325 may increase the amount of audio information collected and/or the sensitivity and accuracy of the audio information. In contrast, using a lesser number of acoustic transducers 325 may decrease the computing power required by an associated controller 335 to process the collected audio information. In addition, the position of each of the acoustic transducers 325 of the microphone array may vary. For example, the position of a given one of the acoustic transducers 325 may include a defined position on the user, a defined coordinate on frame 310, a particular orientation, or some combination thereof.

The acoustic transducers 325(A) and 325(B) may be positioned on different parts of the user's ear, such as behind the pinna, behind the tragus, and/or within the auricle or fossa. Or there may be additional acoustic transducers 325 on or surrounding the ear in addition to acoustic transducers 325 inside the ear canal. Having one or more of the acoustic transducers 325 positioned next to an ear canal of a user may enable the microphone array to collect information on how sounds arrive at the ear canal. For example, by positioning at least two of acoustic transducers 325 on either side of a user's head (e.g., as binaural microphones), the augmented reality system 300 may simulate binaural hearing and capture a 3D stereo sound field around about a user's head. In some embodiments, the acoustic transducers 325(A) and 325(B) may be connected to the augmented reality system 300 via a wired connection 340, and in other embodiments the acoustic transducers 325(A) and 325(B) may be connected to the augmented reality system 300 via a wireless connection (e.g., a Bluetooth connection). In still other embodiments, the acoustic transducers 325(A) and 325(B) may not be used at all in conjunction with the augmented reality system 300.

The acoustic transducers 325 on the frame 310 may be positioned in a variety of different ways, including along the length of the temples, across the bridge, above or below the display devices 315(A) and 315(B), or some combination thereof. The acoustic transducers 325 may also be oriented such that the microphone array is able to detect sounds in a wide range of directions surrounding the user wearing the augmented reality system 300. In some embodiments, an optimization process may be performed during manufacturing of the augmented reality system 300 to determine relative positioning of each of the acoustic transducers 325 in the microphone array.

In some examples, the augmented reality system 300 may include or be connected to an external device (e.g., a paired device), such as the neckband 330. The neckband 330 generally represents any type or form of paired device. Thus, the following discussion of the neckband 330 may also apply to various other paired devices, such as charging cases, smart watches, smart phones, wrist bands, other wearable devices, hand-held controllers, tablet computers, laptop computers, other external computer devices, etc.

As shown, the neckband 330 may be coupled to the eyewear device 305 via one or more connectors. The connectors may be wired or wireless and may include electrical and/or non-electrical (e.g., structural) components. In some cases, the eyewear device 305 and the neckband 330 may operate independently without any wired or wireless connection between them. While FIG. 3A illustrates the components of the eyewear device 305 and the neckband 330 in example locations on the eyewear device 305 and the neckband 330, the components may be located elsewhere and/or distributed differently on the eyewear device 305 and/or the neckband 330. In some embodiments, the components of the eyewear device 305 and the neckband 330 may be located on one or more additional peripheral devices paired with the eyewear device 305, the neckband 330, or some combination thereof.

Pairing external devices, such as the neckband 330, with augmented reality eyewear devices may enable the eyewear devices to achieve the form factor of a pair of glasses while still providing sufficient battery and computation power for expanded capabilities. Some or all of the battery power, computational resources, and/or additional features of the augmented reality system 300 may be provided by a paired device or shared between a paired device and an eyewear device, thus reducing the overall weight, heat profile, and form factor of the eyewear device while still retaining desired functionality. For example, the neckband 330 may allow components that would otherwise be included on an eyewear device to be included in the neckband 330 since users may better tolerate a heavier weight load on their shoulders than on their heads. The neckband 330 may also have a larger surface area over which to diffuse and disperse heat to the ambient environment. Thus, the neckband 330 may allow for greater battery and computation capacity than might otherwise have been possible on a stand-alone eyewear device. Since weight carried in the neckband 330 may be less invasive to a user than weight carried in the eyewear device 305, a user may tolerate wearing a lighter eyewear device and carrying or wearing the paired device for greater lengths of time than a user would tolerate wearing a heavy standalone eyewear device, thereby enabling users to more fully incorporate extended reality environments into their day-to-day activities.

The neckband 330 may be communicatively coupled with the eyewear device 305 and/or to other devices. These other devices may provide certain functions (e.g., tracking, localizing, depth mapping, processing, storage, etc.) to the augmented reality system 300. In the embodiment of FIG. 3A, for example, the neckband 330 may include two acoustic transducers (e.g., 325(I) and 325(J)) that are part of the microphone array (or potentially form their own microphone subarray). The neckband 330 may also include a controller 342 and a power source 345.

The acoustic transducers 325(I) and 325(J) of the neckband 330 may be configured to detect sound and convert the detected sound into an electronic format (analog or digital). In the embodiment of FIG. 3A, the acoustic transducers 325(I) and 325(J) may be positioned on the neckband 330, thereby increasing the distance between the neckband acoustic transducers 325(I) and 325(J) and other ones of the acoustic transducers 325 positioned on the eyewear device 305. In some cases, increasing the distance between the acoustic transducers 325 of the microphone array may improve the accuracy of beamforming performed via the microphone array. For example, if a sound is detected by the acoustic transducers 325(C) and 325(D) and the distance between acoustic transducers 325(C) and 325(D) is greater than, e.g., the distance between acoustic transducers 325(D) and 325(E), the determined source location of the detected sound may be more accurate than if the sound had been detected by the acoustic transducers 325(D) and 325(E).

The controller 342 of the neckband 330 may process information generated by the sensors on the neckband 330 and/or the augmented reality system 300. For example, the controller 342 may process information from the microphone array that describes sounds detected by the microphone array. For each detected sound, the controller 342 may perform a direction-of-arrival (DOA) estimation to estimate a direction from which the detected sound arrived at the microphone array. As the microphone array detects sounds, the controller 342 may populate an audio data set with the information. In embodiments in which the augmented reality system 300 includes an inertial measurement unit (IMU) located on the eyewear device 305, the controller 342 may compute all inertial and spatial calculations from the IMU. A connector may convey information between the augmented reality system 300 and the neckband 330 and between the augmented reality system 300 and the controller 342. The information may be in the form of optical data, electrical data, wireless data, or any other transmittable data form. Moving the processing of information generated by the augmented reality system 300 to the neckband 330 may reduce weight and heat in the eyewear device 305, making it more comfortable to the user.

The power source 345 in the neckband 330 may provide power to the eyewear device 305 and/or to the neckband 330. The power source 345 may include, without limitation, lithium-ion batteries, lithium-polymer batteries, primary lithium batteries, alkaline batteries, or any other form of power storage. In some cases, the power source 345 may be a wired power source. Locating the power source 345 on the neckband 330 instead of on the eyewear device 305 may help to better distribute the weight and heat generated by power source 345.

As noted, some extended reality systems may, instead of blending an extended reality with actual reality, substantially replace one or more of a user's sensory perceptions of the real world with a virtual experience. One example of this type of system is a head-worn display system, such as the virtual reality system 350 depicted in FIG. 3B, which mostly or completely covers a user's field of view. The virtual reality system 350 may include a front rigid body 355 and a band 360 shaped to fit around a user's head. The virtual reality system 900350 may also include output audio transducers 365(A) and 365(B). Furthermore, while not shown in FIG. 3B, the front rigid body 355 may include one or more electronic elements, including one or more electronic displays, one or more inertial measurement units (IMUs), one or more tracking emitters or detectors, and/or any other suitable device or system for creating an extended reality experience.

Extended reality systems may include various types of visual feedback mechanisms. For example, display devices in the augmented reality system 300 and/or the virtual reality system 350 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These extended reality systems may include a single display screen for both eyes or may provide a display screen for each eye, which may allow for additional flexibility for varifocal adjustments or for correcting a user's refractive error. Some of these extended reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the extended reality systems described herein may include one or more projection systems. For example, display devices in the augmented reality system 300 and/or the virtual reality system 350 may include micro-LED projectors that project light (using, e.g., a waveguide) into display devices, such as clear combiner lenses that allow ambient light to pass through. The display devices may refract the projected light toward a user's pupil and may enable a user to simultaneously view both extended reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Extended reality systems may also be configured with any other suitable type or form of image projection system, such as retinal projectors used in virtual retina displays.

The extended reality systems described herein may also include various types of computer vision components and subsystems. For example, the augmented reality system 300 and/or the virtual reality system 350 may include one or more optical sensors, such as two-dimensional (2D) or three-dimensional (3D) cameras, structured light transmitters and detectors, time-of-flight depth sensors, single-beam or sweeping laser rangefinders, 3D LiDAR sensors, and/or any other suitable type or form of optical sensor. An extended reality system may process data from one or more of these sensors to identify a location of a user, to map the real world, to provide a user with context about real-world surroundings, and/or to perform a variety of other functions.

The extended reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the extended reality systems described herein may also include tactile (e.g., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independently of other extended reality devices, within other extended reality devices, and/or in conjunction with other extended reality devices.

By providing haptic sensations, audible content, and/or visual content, extended reality systems may create an entire virtual experience or enhance a user's real-world experience in a variety of contexts and environments. For instance, extended reality systems may assist or extend a user's perception, memory, or cognition within a particular environment. Some systems may enhance a user's interactions with other people in the real world or may enable more immersive interactions with other people in a virtual world. Extended reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's extended reality experience in one or more of these contexts and environments and/or in other contexts and environments.

As noted, the extended reality systems 300 and 350 may be used with a variety of other types of devices to provide a more compelling extended reality experience. These devices may be haptic interfaces with transducers that provide haptic feedback and/or that collect haptic information about a user's interaction with an environment. The extended reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4A:
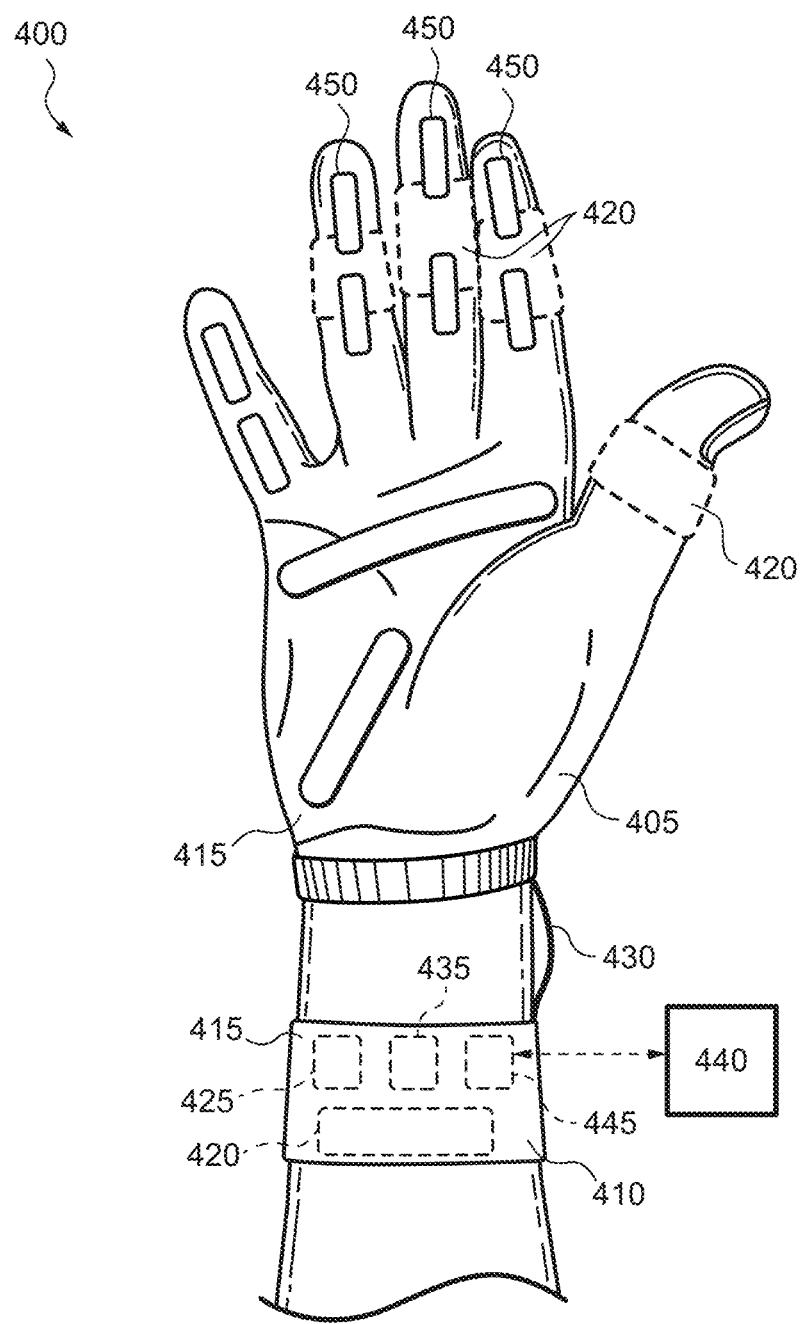
FIG. 4A is an illustration of haptic devices in accordance with various embodiments.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 4A illustrates a vibrotactile system 400 in the form of a wearable glove (haptic device 405) and wristband (haptic device 410). The haptic device 405 and the haptic device 410 are shown as examples of wearable devices that include a flexible, wearable textile material 415 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 420 may be positioned at least partially within one or more corresponding pockets formed in textile material 415 of vibrotactile system 400. The vibrotactile devices 420 may be positioned in locations to provide a vibrating sensation (e.g., haptic feedback) to a user of the vibrotactile system 400. For example, the vibrotactile devices 420 may be positioned against the user's finger(s), thumb, and/or wrist, as shown in FIG. 4A. The vibrotactile devices 420 may, in some examples, be sufficiently flexible to conform to or bend with the user's corresponding body part(s).

A power source 425 (e.g., a battery) for applying a voltage to the vibrotactile devices 420 for activation thereof may be electrically coupled to the vibrotactile devices 420, such as via conductive wiring 430. In some examples, each of the vibrotactile devices 420 may be independently electrically coupled to the power source 425 for individual activation. In some embodiments, a processor 435 may be operatively coupled to the power source 425 and configured (e.g., programmed) to control activation of the vibrotactile devices 420.

The vibrotactile system 400 may be implemented in a variety of ways. In some examples, the vibrotactile system 400 may be a standalone system with integral subsystems and components for operation independent of other devices and systems. As another example, the vibrotactile system 400 may be configured for interaction with another device or system 440. For example, the vibrotactile system 400 may, in some examples, include a communications interface 445 for receiving and/or sending signals to the other device or system 440. The other device or system 440 may be a mobile device, a gaming console, an extended reality (e.g., virtual reality, augmented reality, mixed-reality) device, a personal computer, a tablet computer, a network device (e.g., a modem, a router, etc.), a handheld controller, etc. The communications interface 445 may enable communications between the vibrotactile system 400 and the other device or system 440 via a wireless (e.g., Wi-Fi, Bluetooth, cellular, radio, etc.) link or a wired link. If present, the communications interface 445 may be in communication with the processor 435, such as to provide a signal to the processor 435 to activate or deactivate one or more of the vibrotactile devices 420.

The vibrotactile system 400 may optionally include other subsystems and components, such as touch-sensitive pads 450, pressure sensors, motion sensors, position sensors, lighting elements, and/or user interface elements (e.g., an on/off button, a vibration control element, etc.). During use, the vibrotactile devices 420 may be configured to be activated for a variety of different reasons, such as in response to the user's interaction with user interface elements, a signal from the motion or position sensors, a signal from the touch-sensitive pads 450, a signal from the pressure sensors, a signal from the other device or system 440, etc.

Although the power source 425, the processor 435, and the communications interface 445 are illustrated in FIG. 4A as being positioned in the haptic device 410, the present disclosure is not so limited. For example, one or more of the power source 425, the processor 435, or the communications interface 445 may be positioned within the haptic device 405 or within another wearable textile.

Figure 4B:
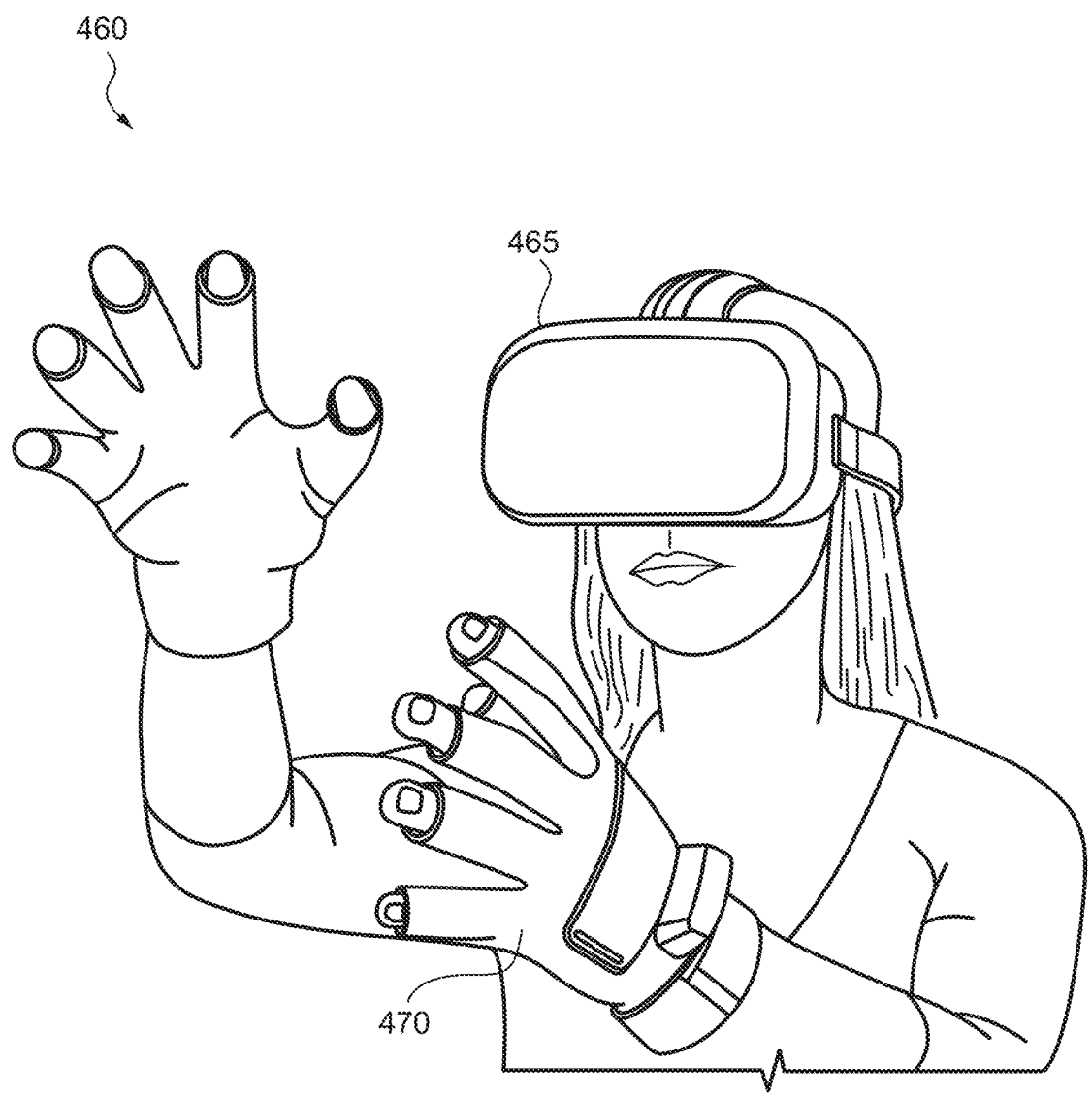
FIG. 4B is an illustration of an exemplary virtual reality environment in accordance with various embodiments.

Haptic wearables, such as those shown in and described in connection with FIG. 4A, may be implemented in a variety of types of extended reality systems and environments. An example of one such extended reality environment 460 is shown in FIG. 4B and includes one head-mounted virtual reality display and two haptic devices (e.g., gloves). Any number and/or combination of these components and other components may be included in other embodiments of an extended reality system. For example, in some embodiments there may be multiple head-mounted displays each having an associated haptic device, with each head-mounted display and each haptic device communicating with the same console, portable computing device, or other computing system.

Figure 3B:
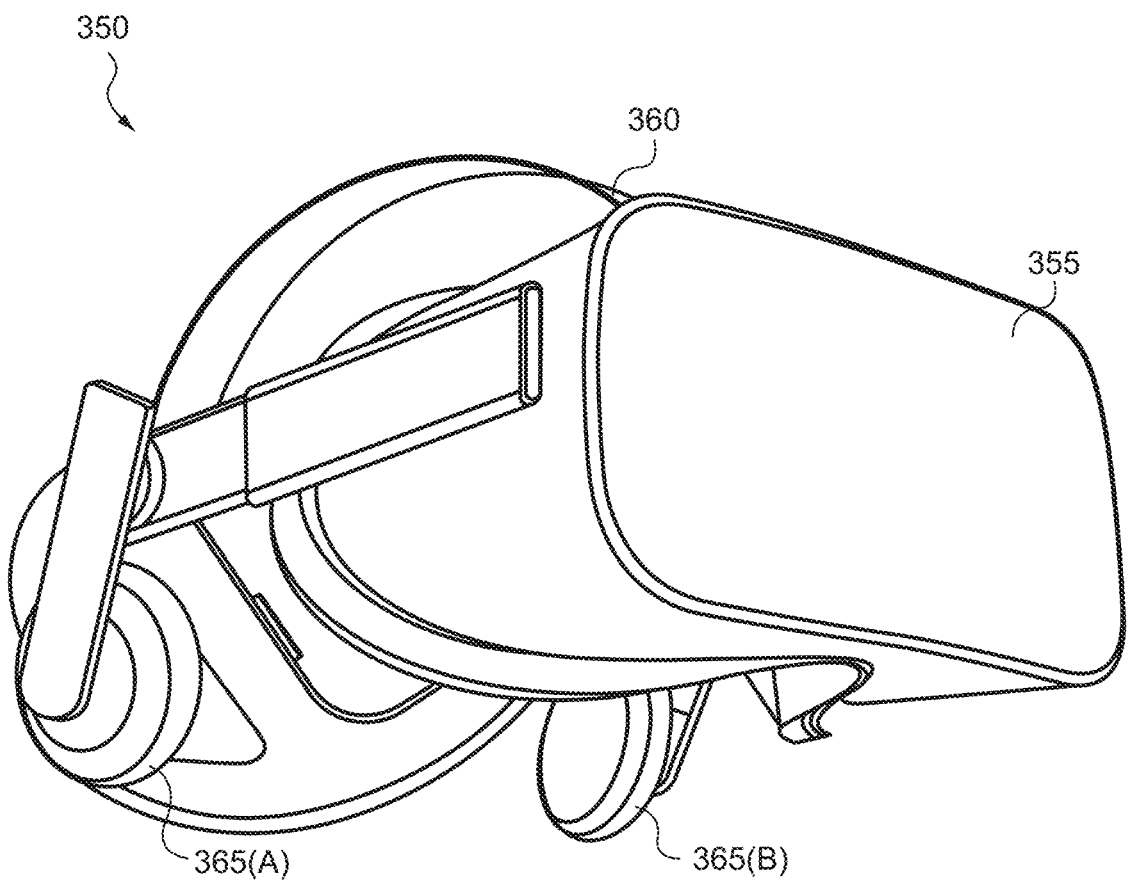
FIG. 3B is an illustration of a virtual reality system in accordance with various embodiments.

In FIG. 4B, the head-mounted-display (HMD) 465 of the extended reality environment 460 generally represents any type or form of virtual reality system, such as the virtual reality system 350 in FIG. 3B. Likewise, the haptic device 470 generally represents any type or form of wearable device, worn by a user of an extended reality system, that provides haptic feedback to the user to give the user the perception that he or she is physically engaging with a virtual object. In some embodiments, the haptic device 470 may provide haptic feedback by applying vibration, motion, and/or force to the user. For example, the haptic device 470 may limit or augment a user's movement. To give a specific example, the haptic device 470 may limit a user's hand from moving forward so that the user has the perception that his or her hand has come into physical contact with a virtual wall. In this specific example, one or more actuators within the haptic device may achieve the physical-movement restriction by pumping fluid into an inflatable bladder of the haptic device. In some examples, a user may also use haptic device 470 to send action requests to a console. Examples of action requests include, without limitation, requests to start an application and/or end the application and/or requests to perform a particular action within the application.

Figure 4C:
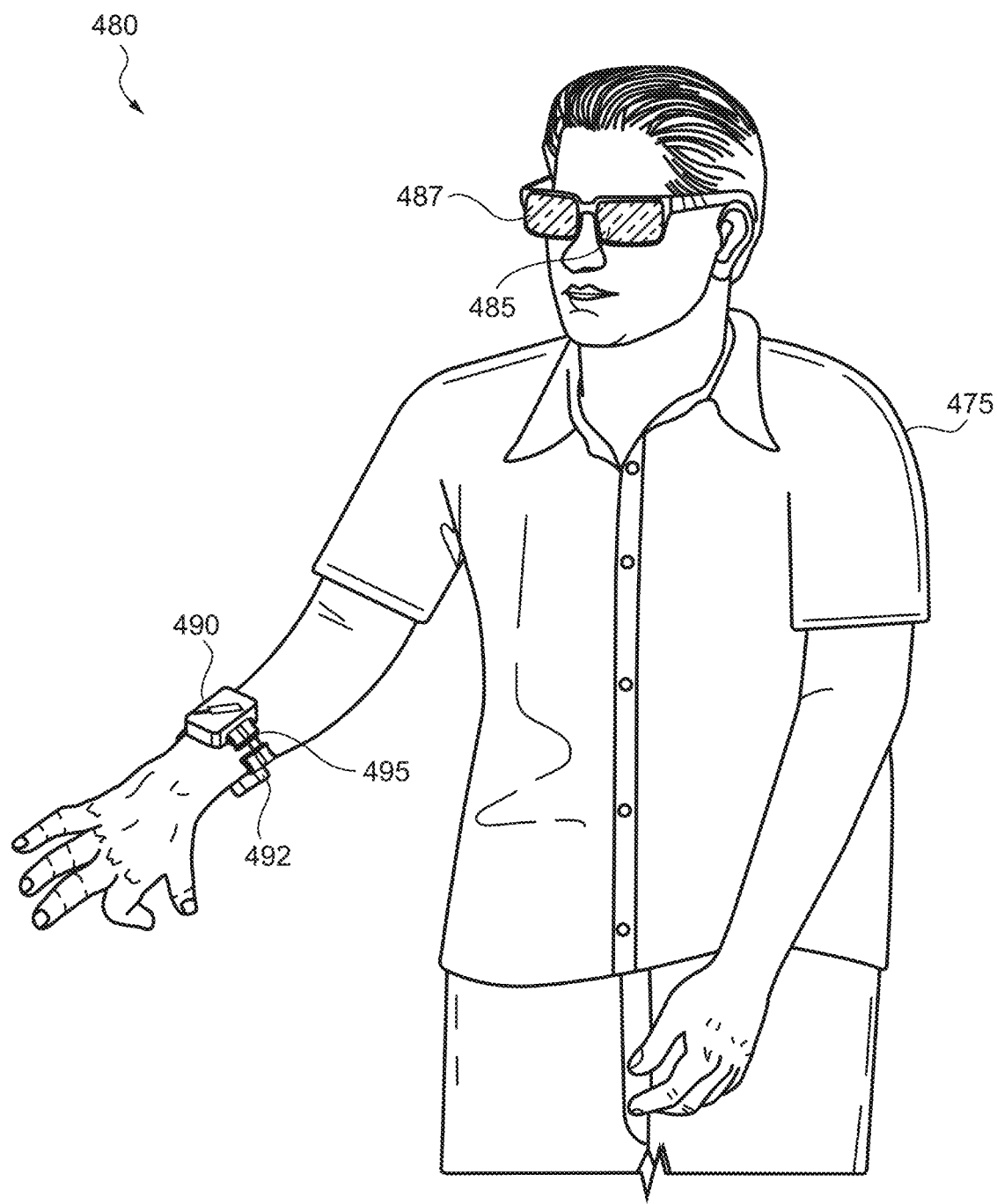
FIG. 4C is an illustration of an exemplary augmented reality environment in accordance with various embodiments.

While haptic interfaces may be used with virtual reality systems, as shown in FIG. 4B, haptic interfaces may also be used with augmented reality systems, as shown in FIG. 4C, where a user 475 is interacting with an augmented reality system 480. In this example, the user 475 may wear a pair of augmented reality glasses 485 that may have one or more displays 487 and that are paired with a haptic device 490. In this example, the haptic device 490 may be a wristband that includes a plurality of band elements 492 and a tensioning mechanism 495 that connects the band elements 492 to one another.

One or more of the band elements 492 may include any type or form of actuator suitable for providing haptic feedback. For example, one or more of the band elements 492 may be configured to provide one or more of various types of cutaneous feedback, including vibration, force, traction, texture, and/or temperature. To provide such feedback, the band elements 492 may include one or more of various types of actuators. In one example, each of the band elements 492 may include a vibrotactor (e.g., a vibrotactile actuator), which can be configured to vibrate in unison or independently to provide one or more of various types of haptic sensations to a user. Alternatively, only a single band element or a subset of band elements may include vibrotactors.

The haptic devices 405, 410, 470, and 490 of FIGS. 4A-4C may include any suitable number and/or type of haptic transducer, sensor, and/or feedback mechanism. For example, the haptic devices 405, 410, 470, and 490 may include one or more mechanical transducers, piezoelectric transducers, and/or fluidic transducers. The haptic devices 405, 410, 470, and 490 may also include various combinations of different types and forms of transducers that work together or independently to enhance a user's extended reality experience. In one example, each of the band elements 492 of the haptic device 490 may include a vibrotactor (e.g., a vibrotactile actuator) configured to vibrate in unison or independently to provide one or more of various types of haptic sensations to a user.

Adaptive Tangible User Interface

While extended reality systems have evolved and become more adept at providing a user with an immersive virtual experience, there is still much room for improvement. For example, despite the evolution of extended reality technology, interaction between a user and the extended reality environment has nonetheless been limited generally to techniques such as mid-air hand gestures or the use of a purposefully designed tangible user interface such as a computer mouse and other known input devices. However, mid-air hand gestures return no tactile feedback to the user when interacting with virtual content, and a preexisting tangible user interface such as a computer mouse most often will not relate in any meaningful way to the virtual environment with which a user is interacting, and also requires the user to have the computer mouse or other input device present when needed and to transport the computer mouse or other input device with the user as the user's location changes.

An adaptive tangible user interface (ATUI) according to examples of the present disclosure overcomes issues relating to user interactions with an extended reality environment that are either non-tactile in nature, or make use of a tangible real-world physical object that is unrelated to the extended reality environment, and/or not normally present in the context of the user's current real-world physical environment.

As part of developing ATUIs according to the present disclosure, a study was conducted in which participants were asked to perform the cause of a series of identified effects using gestures conducted with a number of different physical objects. The gestures covered different dimensions of input in a spatial computing environment. The study allowed for observation and identification of the interaction models chosen by the users, which can be used to help inform the design of a system implementing an ATUI according to the present disclosure. For example, based at least in part on the observations made during the study, the inventors have determined, without limitation, a set of highly guessable and desirable object-based gestures for different dimensions of spatial interaction; the necessary affordances and signifiers a physical object needs to possess to support the gestures; and a taxonomy to identify and categorize existing physical (everyday) objects based on their interaction affordances.

During the course of interacting with an extended reality environment, it is expected that a user may typically also move within different real-world environments/locations containing various physical objects. Consequently, a gesture set associated with a system implementing an ATUI according to the present disclosure should not be based on any one specific physical object. Instead, gesture sets according to examples of the present disclosure are useable in different real-world environments and are applicable to different physical objects that are encountered by a user.

According to the present disclosure, a system embodiment implementing an ATUI can proactively scan the real-world physical environment of a user to detect and identify existing objects present within the physical environment that can be used as tangible user interfaces for user interaction with the extended reality environment. A system embodiment implementing an ATUI can compose tangible user interfaces (TUIs) on the fly based on detected affordances of the existing objects and one or more input tasks, activities, or other actions to be performed by the user. Composing a TUI according to examples of the present disclosure also includes mapping a user interface (UI) to one or more of the detected and identified existing objects such that the user can use the UI to interact with devices, objects, etc., in the extended reality environment, such as by appropriately manipulating a mapped existing object. An ATUI according to examples of the present disclosure is adaptive in the sense that a system implementing an ATUI can also dynamically adjust the display of already composed TUIs, and/or opportunistically detect and identify new real-world existing objects, to suit the changing context of user actions and locations.

System embodiments implementing an ATUI according to examples of the present disclosure can utilize gestures with physical objects that occur in different dimensions of spatial interaction. For example, and without limitation, examples according to the present disclosure can include one-dimensional (1D), two-dimensional (2D), and three-dimensional (3D) gestures (inputs) via user-manipulated physical objects. System examples may also allow for what is referred to herein as zero-dimensional (0D) and zero-point five dimensional (0.5D) user inputs. Likewise, system examples may further allow for what is referred to herein as multi-dimensional (MD) user inputs.

Certain non-limiting examples of 0D, 0.5D, 1D, 2D, 3D, and MD physical object-based inputs that can be made by a user according to examples of the present disclosure are shown in the table of FIG. 5. One example of a 0D input is shown to include tapping on a surface (e.g., a table surface) to press a virtual button that toggles an input between on and off state or simply expresses confirmation of an action. Another example of a 0D input may be squeezing a physical object (e.g., a water bottle) to confirm an action. One example of a 0.5D input is shown to include using a finger to swipe on a surface (e.g., the surface of a coffee mug) to select a previous or next input, such as may be used to scroll through a carousel of images. 1D inputs can be used to control (e.g., increase or decrease) a value along a 1D axis. One example of a 1D input is shown to include sliding a finger on a surface (e.g., the surface of a chocolate bar) in one direction or another to control a continuously adjustable input such as a volume control. Another example of a 1D input is rotating an object (e.g., a coffee mug) to control a continuously adjustable input. A 2D input can be used to control two values in two different dimensions. One example of a 2D input is moving multiple fingers on a surface (e.g., a desk or table surface) to move a pointer or to control the position of a virtual object in a 2D space (e.g., left/right and up/down). A 3D input can be used to control three values in three different dimensions. One example of a 3D input is shown to include pushing a mug forward to correspondingly move a virtual cube forward in a CAD application. Other examples of 3D inputs include, without limitation, moving a physical object in the air or along a surface (e.g., a desk or table surface) to control the position of a virtual object in a 3D space (e.g., left/right, up/down, and forward/backward) or rotating the physical object to control the orientation of the virtual object in a 3D space. An MD input generally involves using two or more input commands simultaneously. For example, an MD input may involve simultaneous rotating and squeezing a physical object (e.g., water bottle) to control the direction (3D) and pedal (1D) of an airplane in a video game.

As further indicated in FIG. 5, input signals made in an extended reality environment through physical object-based gestures according to examples of the present disclosure may also be categorized as either discrete or continuous in nature. A gesture that controls an input with clear spaces between changes in values can be considered to be a discrete input. For example, and without limitation, tapping on a surface to press a virtual button is considered to be a discrete input in the present disclosure. In contrast, a gesture that controls an input with no spaces between changes in values can be considered to be a continuous input. For example, and without limitation, sliding a finger or an object on a surface to control a virtual slider is considered to be a continuous input in the present disclosure.

In addition to being defined in a dimensional sense, physical object-based inputs that can be made by a user according to examples of the present disclosure can also be categorized based on the input expression strategy used. For example, referring again to the table of FIG. 5, it may be observed that physical object-based inputs made by a user can be categorized, without limitation, as being hand-centric, object-centric, or a combination of object-centric and hand-centric. A hand-centric input is considered herein to be an input that expresses the user's intention through hand movements, such as, for example, when a user swipes a finger on a surface to control a previous/next type of input. An object-centric input is considered herein to be an input that expresses the user's intention through manipulation of a physical object, such as, for example, when a user squeezes an object to express confirmation of an input or rotates a physical object to produce rotation of a virtual object. A combination object-centric and hand-centric input is considered herein to be an input that expresses the user's intention through simultaneous hand movements and physical object manipulation, such as, for example, when a user utilizes a pen as a stylus to point at a virtual slider, then slides a finger on a surface of the pen to control the slider.

Based on the aforementioned study, it has been determined that physical objects should preferably include various characteristics and signifiers in order to be selected for use as input devices in an extended reality system. The object characteristics are referred to herein as affordances or affordance factors. The affordance factors associated with various physical objects can be grouped into categories, such as but not necessarily limited to, geometric, kinetic, semantic and ergonomic categories. Within the geometric affordance factor category may reside, for example and without limitation, object affordances associated with the surface of the physical object (e.g., the surface size or curvature), or an edge of the physical object (e.g., the edge length or curvature). Within the kinetic affordance factor category may reside, for example and without limitation, object affordances associated with a movable structure of the physical object (which may be a discrete or continuous input)), feedback produced by the physical object (e.g., tactile, auditory), or the elasticity of the physical object (e.g., elastic, bendable, rigid). Within the ergonomic affordance factor category may reside, for example and without limitation, object affordances associated with a user's interaction with the physical object (e.g., how grabbable or graspable is the object).

The semantic affordance factors generally relate to how a user is likely to perceive the shape of a given physical object and how the user may relate the shape of the physical object to the shape of other physical objects that they may more readily associate with use as an input device. The semantic affordance factors may, therefore, be further divided into various sub-categories based on a user's likely perception of the shape of a given physical object. For example, semantic affordance factor sub-categories may include, but are not necessarily limited to, shape descriptive sub-categories such as sharp tip-like and button-like, as well as more metaphorical sub-categories such as remote-like, joystick-like, dial-like or wheel-like.

A desirable, but non-limiting, set of such affordance factors is listed in the table of FIG. 6. It can be observed from the table that the various affordance factor categories may also be further characterized as being either micro factors or macro factors. As used herein, macro factors relate to the way a user is likely to perceive the high-level appearance or meaning of a physical object (e.g., a coffee mug may be perceived as being cylindrical and resembling a knob). As used herein, micro factors relate to segmentation characteristics of physical objects (e.g., an armrest on an armchair may include a large flat surface which is suitable for the sliding of a finger or physical object).

As can be understood from the foregoing discussion, a physical object should provide a specific affordance that supports user input on a given dimension to be useful in an opportunistic ATUI system. Based at least in part on the results of the aforementioned study, an affordance-based object taxonomy has been determined, in which physical objects are categorized based on the gestures they can support. An affordance-based object taxonomy according to the present disclosure assumes that micro affordance factors, such as object surface characteristics, object edge characteristics, and object movable structures, are more important to a user relative to gestures/inputs involving fewer dimensions (e.g., 0D-2D), whereas macro affordance factors, such as object grabbability and object shape semantics, are more important to a user relative to gestures/inputs in higher dimensions (e.g., 3D). Further, it is possible in some examples for several dominant affordances factors for certain gestures to overlap. For example, for a finger tap gesture, a smaller/defined surface and another larger surface may both be useable, but the smaller/defined surface may be preferred and may be assigned priority over other surfaces. Such prioritization allows for the creation and use of an object taxonomy where the most desirable identified object in the physical environment is used to afford a given gesture.

A non-limiting listing of physical objects and supported gestures according to one example of such an affordance-based object taxonomy is provided in the table of FIG. 7. The table of FIG. 7 identifies a number of possible user gestures that can be used to generate inputs to an extended reality system according to various examples of the present disclosure, as well as a general description of a corresponding preferred physical object(s) for making the gesture and a more specific example of such a physical object(s). For each identified gesture, the table of FIG. 7 also provides a more basic possible object that can be used and provides an example of such an object. For example, for the identified finger tap gesture, a preferred physical object may be generally described as an object with a small and defined surface area that can act as a specifier to direct the user where to tap on the object. One example of such a physical object is indicated to be a bottle cap. The use of other physical objects to perform a finger tap gesture is also possible, of course, and the table of FIG. 7 indicates the same by identifying a more basic object as essentially any object with a surface, and providing a bike handlebar as one example.

Referring still to FIG. 7 it may be observed that other possible non-limiting object gesture examples include press, squeeze, finger swipe, object swipe, finger slide, object slide, pinch and splay, finger move on surface, object rotate, object move, pointing, and discrete movable structure input. Non-limiting examples, of preferred objects and basic objects (where applicable) are provided for each gesture.

Each of the object-based gestures identified in the table of FIG. 7 is also provided in FIG. 8 in the form of an illustration. As shown in FIG. 8, illustration A represents a finger tap gesture, illustration B represents a pinch and splay gesture, illustration C represents a finger swipe gesture, illustration D represents a press gesture, illustration E represents a finger slide gesture, illustration F represents a squeeze gesture, illustration G represents an object move gesture, illustration H represents a pointing gesture, illustration I represents a movable structure input gesture, illustration J represents a finger move on surface gesture, illustration K represents an object slide gesture, illustration L represents an object rotate gesture, and illustration M represents an object swipe gesture.

Adaptive Tangible User Interface System

The on-the-fly composition and use of opportunistic ATUIs according to examples of the present disclosure presents a new approach to user interaction with an extended reality environment. A system according to examples of the present disclosure repurposes the real-world environment around the user into an adaptive interface.

One example of a system implementing one or more ATUIs in an extended reality environment according to the present disclosure may include at least an object affordance factor detector and a TUI real-time composer. The object affordance factor detector component can operate to examine the real-world environment around the user and to identify the affordance factors provided by physical objects in the real-world environment. More specifically, a system according to the present disclosure can use the object affordance factor detector component to proactively scan the real-world environment, and detect and identify physical objects in the real-world environment that may be usable as gesture-based devices for generating inputs in an extended reality environment. The TUI real-time composer component can recognize potential input tasks based on, for example, an existing spatial UI, and can produce a list of suitable gestures for the input tasks. The TUI real-time composer component can then select a detected and identified nearby physical objects that affords said gestures and determine appropriate controller mappings for the object. Once the TUI is composed, one or more virtual UIs can be overlayed on the physical object to provide feedback and instructions to the user.

According to the present disclosure, scanning of the real-world environment by a system for implementing ATUIs in an extended reality environment can be accomplished in various ways. For example, such a system may be built with computer vision, which has been adopted by most mainstream extended reality devices (e.g., extended reality glasses, HMDs, etc.). The existing spatial-mapping algorithms in such devices can obtain 3D meshes representing the geometry of the real-world physical environment. Using the 3D meshes, both objects (e.g., coffee cup) and the segmentations of the objects (e.g., top of a coffee cup) can be identified and labeled to form a dynamic list of all object-based gestures that the current environment can afford.

Figure 9:
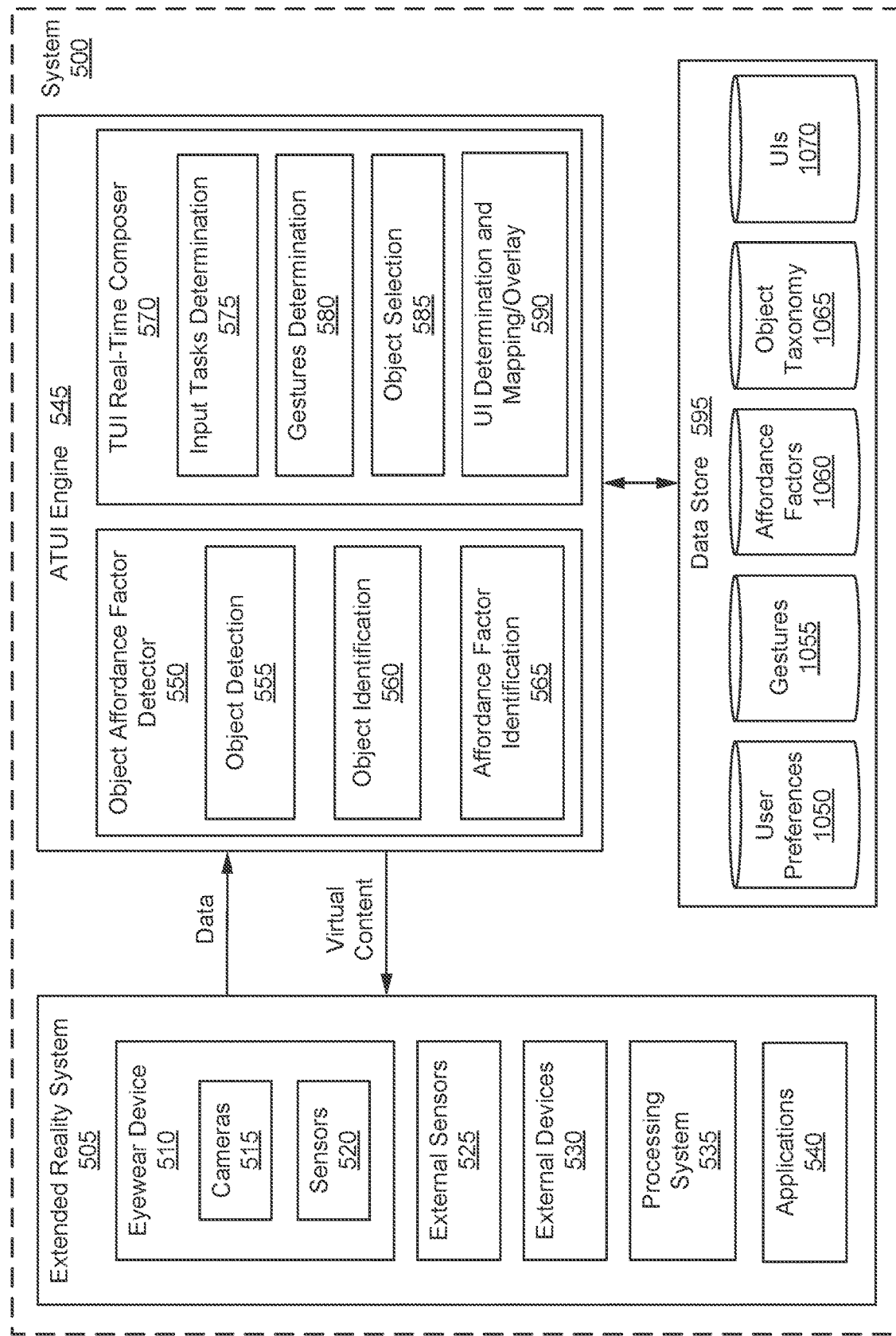
FIG. 9 is a schematic diagram depicting an architecture of a system for implementing an ATUI in an extended reality environment in accordance with various embodiments.

FIG. 9 represents an architecture of a system 500 for implementing an ATUI in an extended reality environment according to one example of the present disclosure. The system 500 includes an extended reality system 505, such as but not limited to augmented reality system 300 of FIG. 3A. The extended reality system 505 can include, for example, an eyewear device 510, such as but not limited to, the eyewear device (glasses) 305 of FIG. 3A. The eyewear device 510 can include cameras 515 and other sensors 520, such as any of the sensors previously described herein. The extended reality system 505 can also include other sensors 525 that are separate from the eyewear device 510 but may be communicatively coupled thereto. The extended reality system 505 can also include external devices 530, such as for example and without limitation, the neckband 330 of FIG. 3A, or the sensor-containing wristband 410 of FIG. 4A that may be operative to report user movement or actions, among other things. External (separate) sensors such as the neckband 330 and/or the wristband 410 may be communicatively coupled to the eyewear device 510 in some embodiments. The extended reality system 505 can further include a processing system 535, on which may run one or more applications 540 for performing extended reality operations.

The system 500 example of FIG. 9 is shown to further include an ATUI engine 545 that may be incorporated in software, hardware, or a combination thereof. The ATUI engine 545 receives data (e.g., image data) from the extended reality system 505 and provides virtual content (e.g., virtual UI overlays) to the extended reality system 505. The ATUI engine 545 can include the aforementioned object affordance factor detector and TUI real-time composer components 550, 570.

The object affordance factor detector component 550 may include an object detection module 555 for detecting, based on for example, data received from the extended reality system 505, physical objects in the real-world environment that are potentially useable as ATUIs in the extended reality environment. The object affordance factor detector component 550 can also include an object identification module 560 for identifying real-world physical objects detected by the object detection module 555. The object affordance factor detector component 550 can additionally include an affordance factor identification module 565 that evaluates an identified physical object to determine the affordance factors possessed by the physical object that may render the physical object useable as a gesture-based input device relative to particular user input tasks.

The TUI real-time composer component 570 of the ATUI engine 545 can include an input tasks determination module 575 that determines the object-based user input tasks that may or are likely to be performed using a physical object selected for use as an ATUI by the object affordance factor detector component 550. The TUI real-time composer component 570 may also include a gestures determination module 580 that considers the object-based gestures that may possibly be made or are likely to be made by a user when performing the input tasks determined by the input tasks determination module 575 relative to a given application and physical object. The TUI real-time composer component 570 may additionally include an object selection module 585 that selects a given physical object for use as an ATUI, such as on the basis of potential input tasks that may be performed by a user of the system, the affordance factors possessed by the physical object, and the nature of the application being used by the user. Potential input tasks may be determined, for example, based on existing spatial user interfaces and a current intent of the user, which the system can determine based on applications in use, user inputs, user movements, etc. The TUI real-time composer component 570 may further include a UI determination and mapping/overlay module 590 that, based on the possible or likely gestures considered by the gestures determination module 580, composes in real time or retrieves from a database, one or more virtual UIs and overlays the one or more virtual UIs on the physical object selected for use as an ATUI in the extended reality environment.

At least the ATUI engine 545 may be communicatively coupled to a data store 595. The data store 595 may include a plurality of databases for storing data useable by components of the ATUI engine 545 relative to detecting, identifying, and selecting a real-world physical object for use as an ATUI in an extended reality environment based at least in part on the affordance factors possessed by the physical object. For example, and without limitation, the data store 595 may include a user preferences database 1050 that may store data regarding the physical objects that different users prefer to use to generate object-based inputs in given applications. The ATUI engine 545 may, for example, use data stored in the user preferences database 1050 when ranking (prioritizing) detected physical objects determined to be useable by a particular user as ATUIs in a known application of an extended reality environment. The data store 595 may include a gestures database 1055 in which is stored a listing of possible gestures (e.g., a listing of the gestures appearing in the table of FIG. 7) that may be performed by a user to perform input tasks using a given physical object. Data from the gestures database 1055 may be used, for example, by the gestures determination module 580. The data store 595 may also include an affordance factors database 1060. The affordance factors database 1060 may store information relating to various possible affordance factors that can be possessed by a given physical object, such as the affordance factors and related information that appears in the table of FIG. 6. The data store 595 may additionally include an object taxonomy database 1065 in which is stored information regarding the taxonomy of object-based gestures, such as the information appearing in the table of FIG. 5. The information stored in the object taxonomy database 1065 may be used, for example, to help inform determinations made by the object affordance factor detector component 550, or to assist the UI determination and mapping/overlay module 590 in composing or retrieving virtual UIs for overlaying on selected real-world physical objects. The data store 595 may further include a UIs database 1070. While the ATUI engine 545 of the system 500 is preferably able to generate virtual UIs in real time, it may also be possible in some system examples for the ATUI engine 545 to simply retrieve a previously generated virtual UI that is applicable to a newly identified and selected real-world object and to input tasks that may be performed or are likely to be performed using the physical object. The use of other databases is, of course, also possible.

Figure 10:
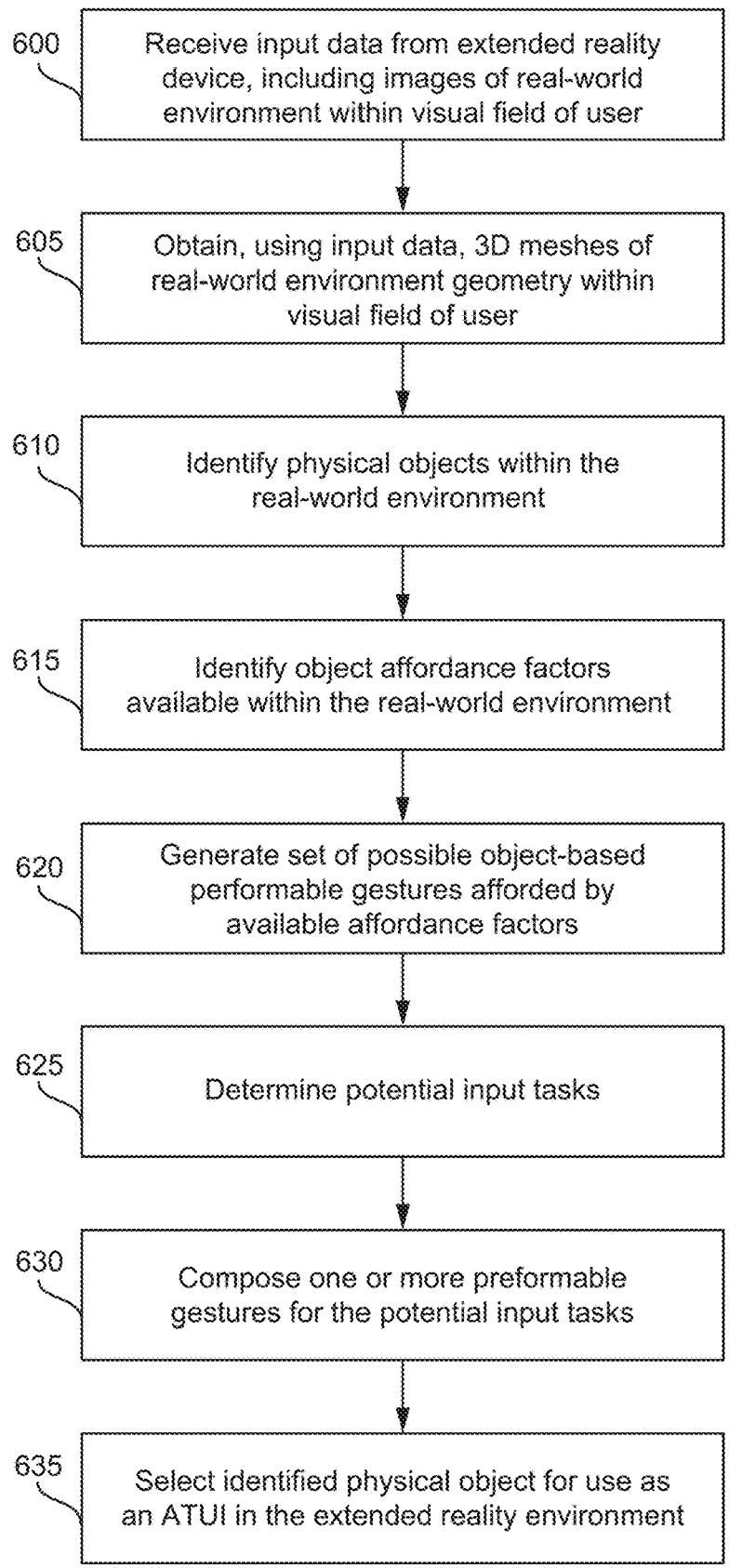
FIG. 10 is a flow diagram representing a process of detecting, identifying, and selecting a real-world physical object for use as an ATUI in an extended reality environment in accordance with various embodiments.

FIG. 10 is a flowchart representing one example of a computer-implemented method of automatically identifying and selecting a physical object in the real-world environment for use as a gesture-based input device within an extended reality environment. The processing depicted in FIG. 10 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10 and described below is intended to be illustrative and non-limiting. Although FIG. 10 depicts the various processing steps occurring in a particular sequence or order, this is not intended to be limiting. In certain other embodiments, the steps may be performed in some different order, or some steps may also be performed in parallel.

At step 600 of FIG. 10, it is represented that input data including images of a real-world environment within a visual field of a user, is received by one or more processors, from one or more sensors of an extended reality device designed to be worn by the user. In some embodiments, the extended reality device may include an eyewear device, for example, augmented reality glasses or a mixed reality headset, and the eyewear device may be equipped with a plurality of sensors including but not limited to one or more types of cameras.

At step 605, three-dimensional meshes representing geometry of the real-world environment within the visual field are obtained using the input data. At step 610, physical objects within the real-world environment are identified based on the three-dimensional meshes. At step 615, object affordance factors available in the real-world environment are identified based on the three-dimensional meshes. To evaluate the affordance factors and their potential use to support a set of possible object-based performable gestures in the real-world environment, the affordance factors may be categorized. For example, the affordance factors may be categorized based on one or more of geometric, kinetic, semantic, and ergonomic characteristics. The affordance factors may also be further divided into micro factor and macro factor sub-categories, where the system may assign more weight to affordance factors in the macro factors sub-category relative to performable gestures in higher dimensions and may assign more weight to affordance factors in the micro factors sub-category relative to performable gestures involving fewer dimensions.

At step 620, a set of possible object-based performable gestures afforded by the object affordance factors in the real-world environment is generated. At step 625, potential input tasks are determined based on existing spatial user interfaces and a current intent of the user. At step 630, one or more performable gestures for the potential input tasks are composed based at least in part on the set of possible object-based performable gestures afforded by the object affordance factors available in the real-world environment and the determined potential input tasks. Composing the one or more performable gestures for the potential input tasks can be a dynamic process that adapts in real time to a changing visual field or changing potential input tasks. At step 635, an identified physical object is selected for use as an adaptive tangible user interface in an extended reality environment based on the composed one or more performable gestures and the object affordance factors available in the real-world environment.

Figure 11:
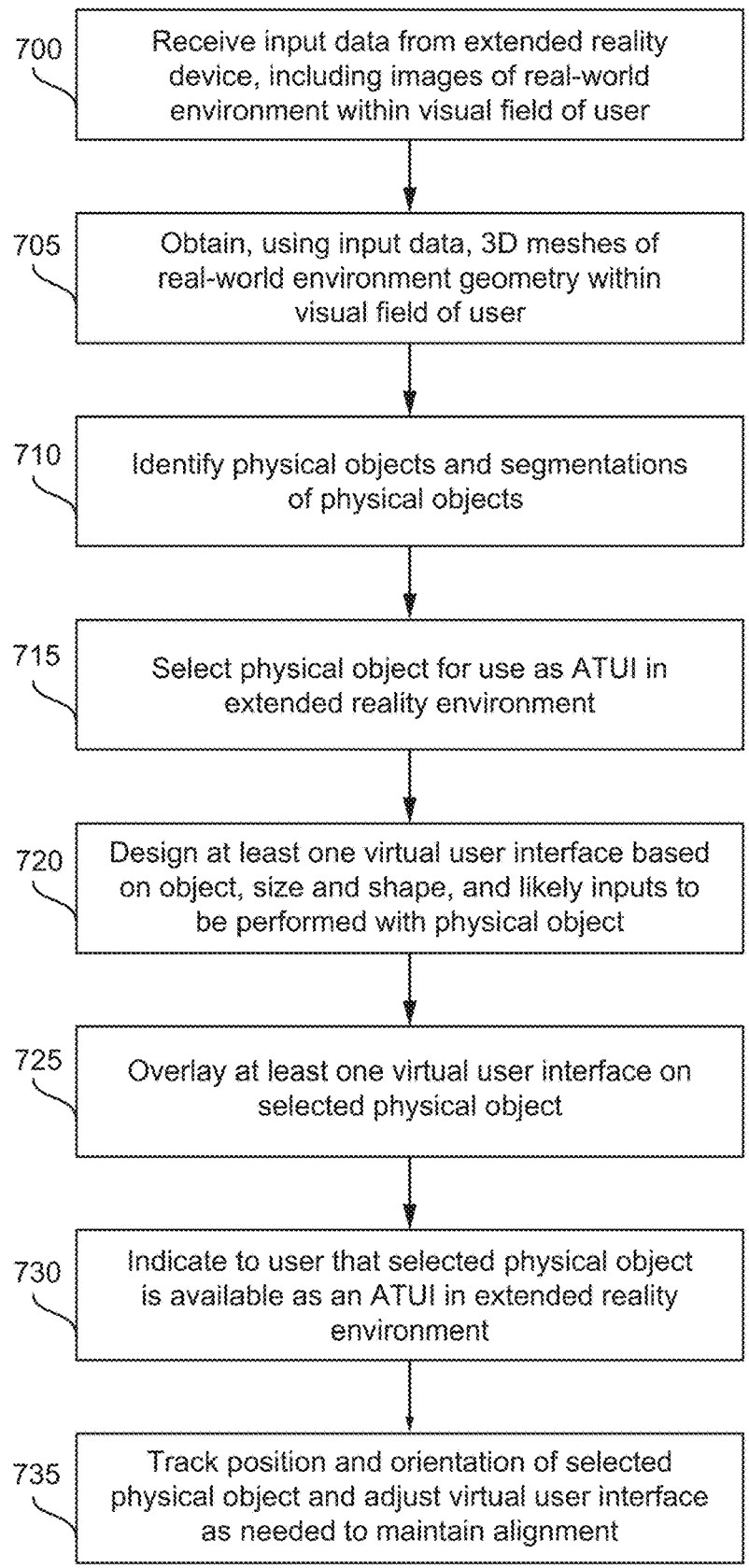
FIG. 11 is a flow diagram representing a process of determining virtual UIs and overlaying virtual UIs on a real-world physical object selected for use as an ATUI in an extended reality environment in accordance with various embodiments.

FIG. 11 is a flowchart representing one example of a process for automatically mapping (overlaying) an appropriate UI to a physical object in the real-world environment that has been selected by a system according to present disclosure for use as a gesture-based input device within an extended reality environment. The processing depicted in FIG. 11 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain other embodiments, the steps may be performed in some different order, or some steps may also be performed in parallel.

At step 700 of FIG. 11, it is represented that input data including images of a real-world environment within a visual field of a user, is received by one or more processors, from one or more sensors of an extended reality device designed to be worn by the user. In some embodiments, the extended reality device may include an eyewear device, for example, augmented reality glasses or a mixed reality headset, and the eyewear device may be equipped with a plurality of sensors including but not limited to one or more types of cameras.

At step 705, three-dimensional meshes representing geometry of the real-world environment within the visual field are obtained using the input data. At step 710, physical objects within the real-world environment are identified based on the three-dimensional meshes. At step 715, a physical object in the real-world environment is selected for use as an ATUI in the extended reality environment. Selection of the physical object can be based on, for example, affordance factors possessed by the physical object, and likely gesture-based input tasks to be performed with the physical object as determined from existing spatial user interfaces and a current intent of the user. Selection of the physical object can also be based on segmentations of the physical object.

At step 720, at least one virtual user interface is designed for use with the selected physical object. The design, shape, size, color, content, etc., of the virtual user interface may be based, without limitation, on a shape of the selected physical object, a size of the selected physical object, and the previously determined likely gesture-based input tasks to be performed with the physical object. At step 725, the at least one virtual user interface is overlaid on the selected physical object. The location on the selected physical object at which the at least one virtual interface is overlaid can vary based on, for example and without limitation, the size, shape, type, and segmentations of the physical object, as well as the nature of the input gestures that are likely to be made by a user while interacting with the at least one virtual user interface.

At step 730, it is indicated to the user that the selected physical object is available as an ATUI in the extended reality environment. An indication that the selected physical object is available as an ATUI in the extended reality environment may be made, for example and without limitation, through the use of an overlaid virtual user interface, and/or by overlaying an icon or another indicator on pre-existing virtual controller, etc., such as was previously described with respect to the storyboard scenes of FIG. 12A. At step 735, the position and orientation of the selected physical object is tracked in real time, such as with cameras of the extended reality system, and the appearance, position, etc., of the at least one overlaid virtual user interface is adjusted as necessary to maintain proper alignment of the at least one virtual user interface with the selected physical object.

Adaptive Tangible User Interface System Implementation

FIGS. 12A-12C present a storyboard illustrating one example of identifying, selecting, and mapping virtual UIs to physical objects in the real-world environment, and subsequently using the physical objects as a gesture-based input devices within an extended reality environment. While not shown in FIGS. 12A-12C, it should be understood that the actions performed in each of the various scenes of the storyboard are performed using a system implementing one or more ATUIs according to the present disclosure, which includes an extended reality device worn by the user, such as but not limited to the eyewear device (glasses) 305 of FIG. 3A or the HMD 350 of FIG. 3B. The user may also wear one or more other related devices, such as for example, the neckband 330 of FIG. 3A, or the sensor-containing glove 405 and/or wrist band 410 of FIG. 4A.

The example scenario presented in FIGS. 12A-12C involves a user viewing and manipulating a 3D virtual automobile 800 presented in the extended reality environment. As indicated by scene A of FIG. 12A, the user is initially presented by an application of the system with a view of the virtual automobile 800 (a front view in this example). The user is also presented with two virtual controllers 805, 810, where the controller 805 on the left is provided for transforming the view (e.g., changing the magnification and/or orientation) of the virtual automobile, and the controller 810 on the right is provided for changing various color attributes (e.g., hue, saturation, and brightness) of the virtual automobile.

As represented by scene B of the storyboard of FIG. 12A, the system detects and identifies, within a field of view of the user, a real-world physical object in the form of a coffee cup 815. The system then determines, such as based on the application being used by the user and the nature of the inputs that can and are likely to be made by the user within the context of the application, that the coffee cup 815 includes affordances that render it suitable as gesture-based input device for manipulating the view of the virtual automobile 800 within the extended reality application. As a result, the system identifies the coffee cup 815 as an ATUI within the extended reality environment by mapping (overlaying) an indicator 820 onto the coffee cup 815. In this particular example, the indicator 820 takes the form of a small circle that is overlaid onto the lid 825 of the coffee cup 815, but such an indicator can be different in other process examples or relative to other physical objects. In this example, once the coffee cup 815 has been identified as an ATUI useable to manipulate the view of the virtual automobile 800, the system also indicates on the virtual controller 805 that the coffee cup 815 can be used to manipulate the view of the virtual automobile 800 in addition to or in lieu of the virtual controller 805. In this example, the indication is in the form of a pair of small coffee cup icons 830 that appear on the virtual controller 805, but other indicators can be used in other examples and/or relative to other objects.

Once the coffee cup 815 has been identified as an ATUI by the system, the user can activate the coffee cup 815, such as for example, by using a finger 835 to tap or double tap on the indicator 820. The indicator 820 may or may not disappear after activation of the coffee cup 815 as an ATUI Upon activation of the coffee cup 815 as a useable ATUI, the system automatically overlays appropriate UIs 840, 845 on the coffee cup 815, and may also overlay one or more UIs 850 on a surface upon which the coffee cup 815 rests (or instead on the coffee cup 815 itself, such as on the lid 825). The UIs can include an indicator that directs the user on how to manipulate the coffee cup 815 to change the size and or orientation of the virtual automobile 800. In this particular example, the overlaid UI 840 indicates how the coffee cup 815 can be manipulated to change the orientation of the virtual automobile 800, the overlaid UI 845 can indicate how the coffee cup 815 can be manipulated to change the orientation of the virtual automobile 800, how the coffee cup 815 can be manipulated to change the scale of the virtual automobile 800, or how the orientation or size of the virtual automobile 800 can be reset. The overlaid UI 850 of this example indicates how the coffee cup 815 may be rotated by the user to change the scale of the virtual automobile 800.

Referring now to the continuation of the storyboard in FIG. 12B, the user is shown in scene C to be reducing the scale of the virtual automobile 800 by rotating the coffee cup 815 according to the UI 850 overlaid on the table surface 855. In the case of this example, rotation of the coffee cup 815 in counterclockwise direction has resulted a reduction in the scale of the virtual automobile 800 (i.e., from the 0.9× magnification indicated in FIG. 12A to the 0.7× magnification indicated in FIG. 12B), as is reflected by the UI 850.

In scene D of the storyboard portion shown in FIG. 12B, the user first squeezes the coffee cup 815 to initiate orientation tracking, as instructed by the UI 850. The coffee cup 815 may then be manipulated by the user to change the yaw and roll orientations of the virtual automobile 800. As represented in scene E of the storyboard, once any desired changes to the scale and/or orientation of the virtual automobile 800 have been completed, the user can reset the scale and the orientation of the virtual automobile 800 to the default scale and orientation shown in scene A, such as by using a finger to tap or double tap on the UI 845 overlaid on the lid 825 of the coffee cup 815.

As shown in FIG. 12C, the remaining portion of the storyboard illustrates use of a physical object present within the real-world environment of the user to change the color characteristics of the virtual automobile 800. Particularly, according to scenes F and G of FIG. 12C, the system detects and identifies, within a field of view of the user, a real-world physical object in the form of a box 860. The system may have detected and identified the box 860 at the same time the system detected and identified the coffee cup 815, but may have ignored the box 860 at that time because the user had indicated a desire to change the scale or orientation of the virtual automobile 800 and the coffee cup 815 was determined to be more a more appropriate ATUI (i.e., was assigned priority) for performing one or both of those tasks. Alternatively, the system may have ignored the box 860 after already detecting and identifying the coffee cup 815, or the box 860 may have been moved to the field of view of the user only after the coffee cup 815 was already identified and/or being used as an ATUI. Likewise, the box 860 may not be detected and identified by the system until the user makes some indication of a desire to change a color characteristic(s) of the virtual automobile 800, such as for example, by engaging in some manner with (e.g., virtually touching, focusing their gaze on) the virtual controller 810 provided for that purpose.

In any case, as indicated in FIG. 12C, once it is understood that the user desires to change a color characteristic(s) of the virtual automobile 800, the system determines that the box 860 includes affordances that render it suitable as gesture-based input device for performing such a task within the application. As a result, the system identifies the box 860 as an ATUI within the extended reality environment. While not specifically shown in FIG. 12C for purposes of brevity, the manner of identifying the box 860 to a user as an ATUI within the extended reality environment may comprise overlaying an indicator onto the box 860 in a manner similar to overlaying the indicator 820 on the coffee cup 815. Other mechanisms for identifying the box 860 as an ATUI in the extended reality environment are, of course, also possible. Although not shown in FIG. 12C for reasons of clarity of the illustration, once the box 860 has been identified as an ATUI useable to manipulate the color characteristics of the virtual automobile 800, the system may indicate in some manner on the virtual controller 810 that the box 860 can be used to manipulate the color characteristics of the virtual automobile 800 in addition to or in lieu of the virtual controller 810. After the box 860 has been identified as an ATUI by the system, the user can activate the box 860, such as for example, by using a finger to tap or double tap on an indicator or otherwise. When used, an activation indicator may or may not disappear after activation of the box 860 as an ATUI.

Upon activation of the box 860 as a useable ATUI, the system automatically overlays appropriate UIs on the box 860, such as the UIs 865, 870 shown. Another UI 875 is also overlaid onto the table surface 880 upon which the box 860 rests. In this example, the UI 865 visually indicates the current value of the color characteristic being changed via manipulation of the box 860, and the UI 870 numerically indicates the current value of the color characteristic being changed via manipulation of the box 860. In this example, the UI 875 comprises a gradated area on the table surface 880 that indicates how a currently selected color characteristic of the virtual automobile 800 will be changed by sliding the box 860 along the table surface 880. For example, slide F of FIG. 12C indicates how the hue of the virtual automobile 800 will change by sliding the box 860 along the table surface 880.

As represented in slide G, by swiping left and right along the top of the box 860, the user can select which of the three different color characteristics (hue, saturation and brightness) of the virtual automobile 800 will be changed by manipulation of the box 860. The UI 875 may appropriately change in appearance when a given color characteristic is selected, and the textual indication of the selected color characteristic appearing in the UI 870 can obviously also change.

While not specifically represented in FIG. 12C, the user may be able to reset the color characteristics of the virtual automobile 800 to the default color characteristics shown in scene F by, for example, using a finger to tap or double tap on the UI 865 overlaid on the box 860, or by engaging in some other interaction with the box 860. Additionally, while not specifically indicated in the storyboard of FIGS. 12A-12C, after activation as an ATUI, it may be possible to permanently or temporarily deactivate/remove one or both of the coffee cup 815 and the box 860 as an ATUI by some user interaction with an overlaid UI or by some other technique. Similarly, the user may be able to cause the system to abandon a particular physical object identified as a suitable ATUI if the user prefers not to use the identified physical object as an ATUI, or if the user would prefer to instead use as an ATUI another physical object that is present within the real-world environment. For example, while the system might prioritize the coffee cup 815 over the box 860 as an ATUI for changing the scale or orientation of the virtual automobile 800, the user may instead prioritize the box 860 for controlling those inputs. Consequently, if system identifies the coffee cup 815 as the best available ATUI when it is determined that the user wishes to change the scale or orientation of the virtual automobile 800, but the user would prefer to use the box 860 for this purpose, a user instruction causing the system to abandon the coffee cup 815 may also result in the system subsequently detecting and identifying the box 860 as the remaining best available ATUI for performing the desired scale or orientation changes to the virtual automobile 800.

FIGS. 13A-13D collectively make up another storyboard presenting another example of identifying, selecting, and mapping virtual UIs to physical objects in the real-world environment, and subsequently using the physical objects as a gesture-based input devices within an extended reality environment. In comparison to the example set forth in the storyboard of FIGS. 12A-12C, FIGS. 13A-13D further illustrate how systems according to examples of the present disclosure can operate to detect and identify physical objects suitable for use as ATUIs in different/changing user locations in the real-world environment, and can correspondingly select and map UIs to said physical objects that are appropriate to performing various user tasks within different/changing extended reality environments.

While the actions performed in each of the various scenes of the storyboard of FIGS. 13A-13C are performed using a system implementing one or more ATUIs according to the present disclosure that includes a user-worn extended reality eyewear device in the form of glasses, such as the glasses 305 of FIG. 3A, the use of other user-worn extended reality devices is also possible. For example, during at least a part of the example use scenario presented in FIGS. 13A-13D, another user-worn extended reality device, such as the HMD 350 of FIG. 3B, may be substituted for the glasses initially worn by the user. The user is also shown to be wearing a sensor-containing wrist band, such as the wrist band 410 of FIG. 4A, and may also wear one or more other related devices, such as for example, the neckband 330 of FIG. 3A, or the sensor-containing glove 405 of FIG. 4A.

In the example scenario presented in FIGS. 13A-13D, a user 900 is initially shown in scene A of FIG. 13A to be riding a bicycle 905 to a destination, such as to the user's office. As noted above, the user 900 is wearing an extended reality eyewear device in the form of glasses 910, as well as a sensor-containing wrist band 915. The user is also either carrying a mobile phone (not shown) that communicates with the glasses 910, or a mobile phone is built into the glasses 910 (referred to hereinafter as a mobile phone in either case). As depicted in scene B, the user 900 receives a call on the mobile phone. The system implementing an ATUI as represented in FIGS. 13A-13D of the present disclosure detects the incoming call and correspondingly scans the real-world environment that is safely within the user's field of vision for a physical object suitable for use as an ATUI. In this example, the system detects a portion of a bicycle handlebar 920 that is near the user's hand 925 (right hand in this example) and identifies the portion of the bicycle handlebar 920 as including accordances that render it suitable as an ATUI for answering the incoming phone call. The system then presents the user 900 with an appropriately positioned floating virtual UI 925 that indicates to the user 900 that the incoming phone call can be answered by swiping on the identified portion of the bicycle handlebar 920, and the user 900 answers the phone call by swiping on the identified portion of the bicycle handlebar 920 with his thumb.

In scene C of FIG. 13A, the user 900 has arrived at the destination and dismounted the bicycle 905. The user 900 has subsequently picked up a box 930, which the user is carrying with him into the destination. As he walks, the user 900 indicates to the system that he is ready to end the phone call. In this example, the indication to end the phone call is a downward head gesture of the user 900 that is detected by the glasses 910. Other indication mechanisms are, of course, also possible. Upon determining that the user 900 wishes to end the phone call, the system presents the user 900 with another floating virtual UI 935 that indicates to the user 900 that the phone call can be ended by tapping on a bottom of the box 930. The user then ends the phone call by tapping on a bottom of the box 930, which is detected by a sensor(s) in the wrist band 915 based on the user's hand movement and relayed to the system.

In scene D of FIG. 13B, the user 900 has entered the destination (office). In scene E of FIG. 13B, the user 900 encounters a co-worker 940 who has approached a coffee machine 945 for the purpose of dispensing a cup of coffee. In similar fashion to the user 900, the co-worker 940 also wears extended reality glasses 950 and a sensor-containing wrist band 955, either or both of which may or may not be the same as the extended reality glasses 910 and the wrist band 915 worn by the user 900.

A system implementing an ATUI relative to the co-worker 940 detects the coffee machine 945 and anticipates possible actions by the co-worker 940 when using the coffee machine 945. As a result, the system initially presents the co-worker 940 with an appropriately positioned floating virtual UI 960 that indicates to the co-worker 940 various coffee selections (e.g., types, hot/cold, flavors, etc.) that are available from the coffee machine 945. As shown, the virtual UI 960 also indicates to the co-worker 940 that the coffee selections can be scrolled through by swiping right or left on the virtual UI 960, such as with a finger of the co-worker 940.

As represented in scene F of FIG. 13B, subsequent to the co-worker 940 making a coffee selection (not expressly shown), the system may generate several new virtual UIs. In this particular example, the system overlays a virtual water temperature slider selector 965, a virtual coffee grind slider selector 970, and a virtual dose (steamed milk temperature) slider selector 975 on the coffee machine 945. Each of the virtual water temperature slider selector 965, the virtual coffee grind slider selector 970, and the virtual dose slider selector 975, also includes a virtual floating gauge or indicator that can be used to display respective water temperature, coffee grind, and steamed milk temperature values. The user can adjust water temperature, coffee grind, or steamed milk temperature parameters by sliding a finger along appropriate ones of the virtual slider selectors 965, 970, 975 overlaid on the coffee machine 945. In scene F, the co-worker 940 is shown to be adjusting the steamed milk temperature by sliding a finger along the virtual dose slider selector 975 overlaid on the coffee machine 945. In this example, this also results in temporary enlargement/magnification of the virtual gauge portion of the virtual dose slider selector 975 to better reveal the adjusted milk steaming temperature.

In scene G of FIG. 13C, the user 900 and the co-worker 940 have gathered around a conference room table 980 with other co-workers 985, 990 (collectively referred to hereinafter as participants) for a meeting regarding a new automobile the group is designing. As with the user 900 and the co-worker 940, the additional co-workers 985, 990 also wear extended reality glasses 950 and sensor-containing wrist bands, which may or may not be the same as the extended reality glasses and the wrist bands worn by the user 900 and the co-worker 940.

Based on the purpose of the meeting, an application associated with or in communication with a system implementing an ATUI according to the present disclosure, is operating to produce actions commensurate with reviewing and revising the design of the automobile. Thus, the system is aware of the possible tasks to be performed by one or more of the meeting participants.

As further represented in scene G of FIG. 13C, the system detects and identifies, within a field of view of at least the user 900 who leads the meeting, and likely the field of view of all of the participants in this example, a real-world physical object in the form of a coffee cup 995. The system then determines, based on the application being used and the nature of the inputs that can and are likely to be made by the user 900 within the context of the application, that the coffee cup 995 includes affordances that render it suitable as gesture-based input device relative to the application. As a result, the system identifies the coffee cup 995 as an ATUI within the extended reality environment, such as by mapping (overlaying) an indicator onto the coffee cup as previously described with respect to the example system operation scenario illustrated in FIGS. 12A-12C. Once the coffee cup 995 has been identified as an ATUI by the system, the user 900 activates the coffee cup 995, such as for example, by tapping or double tapping on a top of the coffee cup 995 with a finger.

As illustrated in scene H of FIG. 13C, upon activation of the coffee cup 995 as a useable ATUI, the system automatically generates and presents to the user 900 a floating virtual UI in the form of a menu 1000 of selectable automobile designs. The user 900 then selects a design to be discussed, such as for example, by touching his finger to the virtual menu 1000, by pointing to the selected design on the virtual menu 1000, etc.

Scene I of FIG. 13C illustrates that, subsequent to the user 900 selecting an automobile design of interest from the virtual meu 1000, the application generates a holographic image of the automobile 1005 that is viewable by all of the participants. While not expressly indicated in FIG. 13C, the system can correspondingly overlay appropriate UIs on the coffee cup 995 that indicate to the user 900 how to use the coffee cup 995 to manipulate the holographic image of the automobile 1005. The UI overlay process may be the same as or similar to the process described with respect to the coffee cup 815 of FIGS. 12A-12C. As further represented in scene I, the user 900 picks up the coffee cup 995, activates the coffee cup 995 as an ATUI by squeezing it, and manipulates the scale and/or orientation of the holographic image of the automobile 1005 through appropriate movements of the coffee cup 995. In this particular system example, the holographic image of the automobile 1005 may also be deactivated via the coffee cup 995 when no longer needed, such as for example, by double tapping on the top of the coffee cup 995.

Referring now to scene J of FIG. 13D, the user 900 and the co-worker 940 are subsequently in another automobile design review meeting with still other co-workers, all of whom are wearing extended reality glasses. A holographic image of an automobile 1010 of interest is again displayed for viewing and discussion by the meeting participants. During the meeting, it is determined to make certain changes to the design of the automobile 1010. Having proactively scanned the real-world environment within the field of view of the participants, the system has detected and identified a real-world physical object in the form of a marker 1015. The system then determines, based on information from the application being used or a gesture or other indication from one or more of the participants, that the marker 1015 includes affordances that render it suitable as gesture-based input device relative to indicating design changes on the holographic image of the automobile 1010. As a result, the system identifies the marker 1015 as an ATUI within the extended reality environment, such as for example, by mapping an indicator onto the marker 1015 in a similar manner to that previously described with respect to the coffee cup 815 of FIGS. 12A-12C, or otherwise.

As indicated in scene K, once the marker 1015 has been identified as an ATUI by the system, the user 900 activates the marker 1015, such as for example, by squeezing the marker, or by tapping, double tapping, or pressing on a virtual activation UI icon 1020 that is overlaid on the marker 1015 by the system when the marker is picked up by the user 900. Activating the marker 1015 as an ATUI repurposes the marker 1015 as a virtual drawing tool. As represented in scene L, the user 900 subsequently uses the marker 1015 to add virtual design change markings 1030 to the holographic image of the automobile 1010 for viewing by the meeting participants. When the user 900 is finished using the marker 1015 as a virtual drawing tool, the marker 1015 may, in this example, be deactivated as an ATUI by tapping, double tapping, or pressing on a virtual deactivation UI icon 1025 that is also overlaid on the marker 1015 by the system. The marker 1015 can thereafter be used as a real-world drawing tool without affecting the holographic image of the automobile 1010 or providing any other inputs to the extended reality environment.

It should be understood that, while it may be possible for system and method embodiments described herein to serve as the sole mechanism of user interaction with an extended reality environment, it is instead intended, but not required, that system and method embodiments described herein be used in conjunction with other mechanisms of user interaction with an extended reality environment. For example, it is possible that in some cases, object-based gestures may have advantages over other types of input mechanisms/gestures, such as mid-air hand gestures, while in other cases they may not. Consequently, in at least some system embodiments, it may be preferable to delegate certain input tasks to object-based gestures and other input tasks to gestures that are not object based (e.g., to mid-air hand gestures, a computer mouse, etc.), or to at least give a user a choice between object-based and non-object-based gesture inputs. It may also be necessary in at least some use cases, that both object recognition and hand tracking will be required to provide sufficient level of user interactivity with the extended reality environment.

ADDITIONAL CONSIDERATIONS

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory computer-readable memory, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. An extended reality system comprising:
one or more processors; and
one or more memories accessible to the one or more processors, the one or more memories storing a plurality of instructions that are configured to be executable by the one or more processors to cause the one or more processors to perform processing including:
identifying physical objects within a real-world environment using data captured by one or more sensors;
based on the physical objects, identifying object affordance factors available in the real-world environment;
generating a set of object-based performable gestures performable based on the object affordance factors identified in the real-world environment;
determining input tasks based on existing spatial user interfaces, the input tasks including physical interaction of a user with at least one of the physical objects;
causing display of a virtual control element associated with one or more performable gestures for the input tasks based at least in part on the set of object-based performable gestures and the determined input tasks; and
selecting a physical object of the physical objects, for use as an adaptive tangible user interface (ATUI) in an extended reality environment, the ATUI configured to allow the user to actuate the virtual control element by physically interacting with the physical object of the physical objects to perform a respective input task of the input tasks;
wherein the object affordance factors include characteristics of the physical objects to signify which one or more physical objects among the physical objects are suitable to be used as one or more ATUIs, respectively, in the extended reality environment.

2. The extended reality system of claim 1, the extended reality system further comprising a display for displaying content to a user, wherein the display is a display of an eyewear device comprising a mixed reality headset or augmented reality glasses.

3. The extended reality system of claim 2, further comprising at least one external sensor that is independent from the eyewear device, and is configured to provide data regarding user movement or actions.

4. The extended reality system of claim 3, wherein the at least one external sensor is located in or on a wrist-wearable device.

5. The extended reality system of claim 1, wherein the object affordance factors are categorized based on one or more of geometric, kinetic, semantic, and ergonomic characteristics.

6. The extended reality system of claim 1, wherein:
the object affordance factors comprise a micro factors subcategory and a macro factors sub-category;
macro affordance factors in the macro factors sub-category relate to a a high-level appearance or a meaning of the physical object of the physical objects possessing the affordance factors;
micro affordance factors in the micro factors sub-category relate to segmentation characteristics of the physical object of the physical objects possessing the affordance factors; and
the generating the set of possible object-based performable gestures further includes:
assigning more weight to the macro affordance factors in the macro factors sub-category relative to performable gestures in higher dimensions, and
assigning more weight to the micro affordance factors in the micro factors sub-category relative to performable gestures in fewer dimensions.

7. The extended reality system of claim 1, wherein the plurality of instructions, when executed-by the one or more processors, cause the one or more processors to perform further processing including creating an affordance-based object taxonomy that categorizes the physical object of the physical objects in the real-world environment based on input gestures that are capable of being performed on or with the physical object of the physical objects.

8. The extended reality system of claim 1, wherein the representation of the real-world environment is comprised of three-dimensional meshes representing a geometry of the real-world environment.

9. The extended reality system of claim 1, wherein:
the plurality of instructions, when executed by the one or more processors, cause the one or more processors to determine a current intent of the user, and the determining input tasks is further based on the determined current intent of the user.

10. A computer-implemented method comprising:
identifying physical objects within a real-world environment using data captured by one or more sensors;
based on the physical objects, identifying object affordance factors available in the real-world environment;
generating a set of object-based performable gestures performable based on the object affordance factors identified in the real-world environment;
determining input tasks based on existing spatial user interfaces, the input tasks including physical interaction of a user with at least one of the physical objects;
causing display of a virtual control element associated with one or more performable gestures for the input tasks based at least in part on the set of possible object-based performable gestures and the determined input tasks; and
selecting a physical object of the physical objects, for use as an adaptive tangible user interface (ATUI) in an extended reality environment,
wherein the object affordance factors include characteristics of the physical objects to signify which one or more physical objects among the physical objects are suitable to be used as one or more ATUIs, respectively, in the extended reality environment, the ATUI configured to allow the user to actuate the virtual control element by physically interacting with the physical object of the physical objects to perform a respective input task of the input tasks.

11. The computer-implemented method of claim 10, wherein the captured data includes information received from an eyewear device that includes a mixed reality headset or augmented reality glasses.

12. The computer-implemented method of claim 11, wherein the captured data further includes information received from at least one external sensor that is independent from the eyewear device and is operative to provide data regarding user movement or actions.

13. The computer-implemented method of claim 10, further comprising categorizing the object affordance factors available in the real-world environment based on one or more of geometric, kinetic, semantic, and ergonomic characteristics.

14. The computer-implemented method of claim 10, wherein:
the object affordance factors comprise a micro factors sub-category and a macro factors sub-category;
macro affordance factors in the macro factors sub-category relate to a high-level appearance or meaning of the physical object of the physical objects possessing the affordance factors;
micro affordance factors in the micro factors sub-category relate to segmentation characteristics of the physical object of the physical objects possessing the affordance factors; and
the generating the set of possible object-based performable gestures further comprises:
assigning more weight to the macro affordance factors in the macro factors sub-category relative to performable gestures in higher dimensions, and
assigning more weight to the micro affordance factors in the micro factors sub-category relative to performable gestures in fewer dimensions.

15. The computer-implemented method of claim 10, further comprising creating an affordance-based object taxonomy that categorizes the physical object of the physical objects in the real-world environment based on input gestures that are capable of being performed on or with the physical object of the physical objects.

16. The computer-implemented method of claim 10, wherein the causing display of a virtual control element associated with the one or more performable gestures for the input tasks is a dynamic process that adapts in real time to a change in a field of view or a change in the input tasks.

17. An extended reality system implementing an adaptive tangible user interface (ATUI) in an extended reality environment, the extended reality system comprising:
one or more processors; and
one or more memories accessible to the one or more processors, the one or more memories storing a plurality of instructions that are configured to be executable by the one or more processors to cause the one or more processors to perform processing including:
identifying physical objects and segmentations of the physical objects within a real-world environment using data captured by one or more sensors;
selecting a physical object from the physical objects for use as the ATUI in the extended reality environment, based on affordance factors possessed by the physical object, and likely gesture-based input tasks to be performed with the physical object as determined from existing spatial user interfaces;
designing at least one virtual user interface based on a shape of the selected physical object, a size of the selected physical object, and the likely gesture-based input tasks to be performed with the physical object, the input tasks including physical interaction of a user with at least one of the physical objects;
overlaying the at least one virtual user interface on the selected physical object, the at least one virtual user interface including a virtual control element;
indicating to the user that the selected physical object is available as the ATUI in the extended reality environment; and
tracking a position and an orientation of the selected physical object in real time, and adjusting the at least one virtual user interface to maintain alignment of the at least one virtual user interface with the physical object,
wherein the affordance factors include characteristics of the physical object to signify that the physical object is suitable to be used as the ATUI in the extended reality environment, the ATUI configured to allow the user to actuate the virtual control element by physically interacting with the physical object of the physical objects to perform a respective input task of the input tasks.

18. The extended reality system of claim 17, wherein the extended reality system further comprises a display, wherein the display is a display of an eyewear device comprising a mixed reality headset or augmented reality glasses.

19. The extended reality system of claim 18, further comprising at least one external sensor that is independent from the eyewear device, and is configured to provide data regarding user movement or actions.

20. The extended reality system of claim 19, wherein the at least one external sensor is located in or on a wrist-wearable device.

21. The extended reality system of claim 17, wherein designing the at least one virtual user interface is further based on segmentations of the selected physical object of the physical objects.

22. The extended reality system of claim 17, wherein the at least one virtual user interface includes an indicator that directs the user how to use the physical object of the physical objects to generate at least one input.

23. The extended reality system of claim 17, wherein the one or more sensors include at least one camera for tracking the position and the orientation of the selected physical object in real time.

\* \* \* \* \*